(12) United States Patent
Cedo Perpinya et al.

(10) Patent No.: US 10,187,772 B2
(45) Date of Patent: *Jan. 22, 2019

(54) INDIVIDUALIZED SHORT-RANGE RADIO COMMUNICATION METHOD, SYSTEM AND CENTRAL DEVICE FOR THE IMPLEMENTATION THEREOF

(71) Applicant: Mobiquity Wireless, S.L., Barcelona (ES)

(72) Inventors: Josep Cedo Perpinya, Barcelona (ES); Marc Dalmau Ballester, Barcelona (ES); Jose Manuel Gil Lozano, El Prat De Llobregat (ES); David Maso Mas, Seva (ES); Pedro Monjo Florit, Barcelona (ES)

(73) Assignee: Mobiquity Wireless, S.L., Barcelona (ES)

( * ) Notice: Subject to any disclaimer, the term of this patent is extended or adjusted under 35 U.S.C. 154(b) by 475 days.

This patent is subject to a terminal disclaimer.

(21) Appl. No.: 14/951,856

(22) Filed: Nov. 25, 2015

(65) Prior Publication Data

US 2016/0080926 A1   Mar. 17, 2016

Related U.S. Application Data

(63) Continuation of application No. 14/800,079, filed on Jul. 15, 2015, now Pat. No. 9,924,300, which is a
(Continued)

(51) Int. Cl.
*H04W 4/80* (2018.01)
*H04W 8/00* (2009.01)
(Continued)

(52) U.S. Cl.
CPC ............ *H04W 4/80* (2018.02); *H04L 67/306* (2013.01); *H04L 67/34* (2013.01); *H04W 4/021* (2013.01); *H04W 8/005* (2013.01); *H04W 76/11* (2018.02); *H04W 76/14* (2018.02); *H04W 8/245* (2013.01); *H04W 80/04* (2013.01); *H04W 88/06* (2013.01); *H04W 88/10* (2013.01)

(58) Field of Classification Search
CPC .................................................. H04M 1/7253
See application file for complete search history.

(56) References Cited

U.S. PATENT DOCUMENTS 7,164,907 B2   1/2007   Cochran et al.
7,239,845 B2   7/2007   Ollis et al.
(Continued)

*Primary Examiner* — Ankur Jain
(74) *Attorney, Agent, or Firm* — Carter, Deluca, Farrell & Schmidt, LLP; George Likourezos

(57) ABSTRACT

A short-range radio communication method is presented including the steps of introducing a first communication device; introducing a plurality of second communication devices in operable communication with the first communication device; detecting one or more signals emitted from the plurality of second communication devices; identifying one or more of the plurality of second communication devices emitting the one or more signals by a unique identifier; and setting up an individualized communication between the first communication device and the one or more second communication devices detected and identified within a region defined by the first communication device.

32 Claims, 7 Drawing Sheets

Related U.S. Application Data continuation of application No. 11/816,016, filed as application No. PCT/ES2005/000669 on Dec. 9, 2005, now Pat. No. 9,125,001.

(51) Int. Cl.
  *H04L 29/08* (2006.01)
  *H04W 4/021* (2018.01)
  *H04W 76/14* (2018.01)
  *H04W 76/11* (2018.01)
  *H04W 8/24* (2009.01)
  *H04W 88/10* (2009.01)
  *H04W 88/06* (2009.01)
  *H04W 80/04* (2009.01)

(56) References Cited

U.S. PATENT DOCUMENTS

| | | |
|---|---|---|
| 7,917,089 B2 | 3/2011 | Zheng et al. |
| 9,125,001 B2 | 9/2015 | Cedo Perpinya et al. |
| 2002/0184365 A1 | 12/2002 | Lumley |
| 2002/0184385 A1 | 12/2002 | Kato |
| 2003/0007464 A1 | 1/2003 | Balani |
| 2003/0134629 A1* | 7/2003 | Ollis ............... H04M 1/7253 455/419 |
| 2004/0085947 A1 | 5/2004 | Ekberg et al. |
| 2004/0224699 A1 | 11/2004 | Bull |
| 2005/0007967 A1 | 1/2005 | Keskar et al. |
| 2006/0105713 A1* | 5/2006 | Zheng ............... H04L 41/12 455/41.2 |
| 2015/0382172 A1 | 12/2015 | Cedo Perpinya et al. |

* cited by examiner

INDIVIDUALIZED SHORT-RANGE RADIO COMMUNICATION METHOD, SYSTEM AND CENTRAL DEVICE FOR THE IMPLEMENTATION THEREOF

CROSS-REFERENCE TO RELATED APPLICATIONS

This application is a continuation of U.S. patent application Ser. No. 14/800,079, filed on Jul. 15, 2015, which is a continuation of U.S. patent application Ser. No. 11/816,016, filed on Dec. 19, 2008, now U.S. Pat. No. 9,125,001, which is a U.S. national stage patent application claiming priority under PCT Article 22(1) to a patent application having International Application Number PCT/ES2005/000669 filed on Dec. 9, 2005, the entire disclosures of these applications are incorporated by reference herein.

BACKGROUND

Field of the Art

The present invention relates to an individualized short-range radio communication method and system, and particularly to a method and system of communication between surrounding devices suitable for communicating with one or more technologies and protocols each, and one or more central devices suitable for setting up communications with multiple technologies and protocols each, to find out which technologies and protocols each of said surrounding devices is able to communicate with, and for communicating with each of said surrounding devices in an individualized manner.

The invention also relates to a central device suitable for forming part of said system.

Prior State of the Art

Different proposals are known relating to wireless communication which, making use of the evolution of the technologies existing in said field, attempt to offer the users of personal, preferably portable devices, a variety of functionalities.

Patent application WO-A-02087266 relates to an information distributor and a method of using the same for communicating information to portable computing devices. The method comprises receiving information from a wireless source and transmitting information on demand to a portable device located within the coverage range of the distributor, said transmission including generating a beacon signal, detecting a recognition signal transmitted by said portable device in response to said beacon, and generating in response to said recognition signal, the radio broadcast of said information.

In another patent application of the applicant of the aforementioned background document, specifically application WO-A-02087094, a wireless communication method is proposed which is similar to the one of the preceding background document, the difference here being that it specifies that the beacon signal is generated using a first modulation scheme and the recognition signal with a second different modulation scheme. The recognition signal is also defined as an indicator of reception of the beacon signal by the portable device. The information is finally radio broadcasted according to the mentioned first modulation scheme. In said document a method for transmitting information to a portable device is also proposed using a first communication protocol for transmitting to the device a client program by means of which the device can communicate with a distributor using a communication protocol for data transfer, by means of which a polling signal is transmitted in a manner similar to the proposed wireless communication method, a recognition thereof is detected, and finally information is radio broadcasted.

The recognition signal prompting said radio broadcast does not involve a response and an explicit acceptance of said beacon or polling signal, or of the associated sending of information, by the portable device, it is simply an acknowledgement of reception thereof. On the other hand, the indiscriminate manner in which the proposed distributor in said background document transmits information, in the sense that it radio broadcasts it, distances said background document from the field of individualized communication.

Other contributions to the state of the art are focused on sending information to a personal device according to the situation thereof.

This is the case of document JP-A-2002259011 relating to a personal digital assistant (PDA) and to a program for updating the display thereof. Communication means which are associated to the PDA are responsible for predicting the position of the PDA after consulting electronic equipment or devices surrounding such device. Information is automatically generated according to its position, such information being in menu form relating to said position, which is shown on the display of the PDA.

The proposal made in said document is focused on finding out the position of the user of the PDA by means of the arrangement of a series of "spy" devices surrounding the PDA. The need for such devices, whether they are specifically designed for carrying out such function or conventional devices (e.g. television sets, refrigerators, etc.) in which an additional element has been added to carry out such function, results in a great difficulty and task for carrying out such proposal for each possible location. On the other hand, the aforementioned document makes no reference to the updating of said menus for the same location or to the possibility of interaction by the user.

Patent application US 20040224699 is also focused on the mentioned sending of information to a personal device according to the situation thereof. Said application proposes a method and system for supplying information to a portable device and a portable device. The information which is sent is in accordance with the preferences of the user of the device found out thanks to an identifying signal sent from such device, and with its location, which is found out, for example, by triangulating said identifying signal.

The level of interaction for the user contemplated in said document does not go beyond the prior selection of preferences incorporated in said identifying signal, providing no possibility that the user can interact with the information received, nor that such information is more than static information, nor that the latter is updated if the user readopts a position in which it had previously been in. The start of transmission is also completely conditioned to the prior sending of said identifying signal.

No proposals are known which contemplate a central device suitable for communicating with multiple short-range technologies with a series of surrounding devices, and also suitable for finding out which technology and protocol, or technologies and protocols, each of said surrounding devices is able to communicate with, and to set up a communication with each of the surrounding devices, individualized at least in reference to the technology and protocol, or technologies and protocols, which each of said surrounding devices is able to communicate with.

DESCRIPTION OF THE INVENTION

It appears necessary to provide an evolutionary step with respect to the state of the art enabling automatically individualized short-range radio communication for each surrounding device, at least in reference to the technology and the protocol which each surrounding device is able to communicate with.

According to a first and second aspect, the present invention relates to an individualized short-range radio communication method and system, applicable to communications, which can include applications or programs and multimedia information, between:

at least one first central device suitable for detecting radio-frequency signals of multiple technologies and protocols, and for setting up bidirectional short-range radio communications using said technologies and protocols, and surrounding devices, each of them suitable for bidirectionally communicating by means of at least one short-range technology and at least one protocol, there possibly being one or more surrounding devices using a technology and/or a protocol different from the one used and/or used by another or other surrounding devices, although the method is also applicable for the case in which all the surrounding devices use the same technology and the same protocol.

The method comprises sequentially carrying out the following steps automatically:

a.1) polling by means of said first central device a surrounding area thereof, by means of several or all of said multiple technologies and protocols using at least one detection module dedicated to each of said technologies and protocols used in said polling, for detecting possible radio-frequency signals coming from said surrounding devices with at least one of said multiple technologies and at least one of said protocols, a.2) detecting and identifying, by said first central device, at least a first one of said surrounding devices through the picking up of at least one of said radio-frequency signals, emitted automatically by said first surrounding device by means of one of said multiple technologies and one of said protocols, said radio-frequency signal including at least one unique identifier of said first surrounding device which has sent the radio-frequency signal, and a.3) setting up, by means of the first central device, an individualized communication with said detected surrounding device using at least the same technology and the same protocol with which said radio-frequency signal, in response to the polling, has been emitted.

Preferably said first central device is a first access device located in a first specific place, and said surrounding devices are personal devices, used by users, suitable for carrying out said bidirectional short-range radio communication with at least said first access device when entering a coverage range thereof, said first surrounding device being a first personal device detected and identified in said step a.2), and said method comprising automatically carrying out after at least said step a.3) the following step:

a.4) finding out if said first personal device is adapted for receiving binary data through said individualized communication set up with said first access device, said finding out being carried out:

by means of the processing, by the first access device, of said radio-frequency signal emitted by the first personal device picked up by the first access device, if such signal includes sufficient information so that its processing produces said finding out, or alternatively, by means of the sending, by the first access device, of a signal in the form of a question to the first personal device, the negative response to which, in the form of a corresponding signal, or the absence of a response after a certain period of time, is indicative that the first personal device is not suitable for receiving binary data, and an affirmative response, in the form of a corresponding signal, is indicative that it can receive binary data.

Preferably if said finding out of said step a.4) offers as a result that the first personal device is not suitable for receiving binary data, the method comprises automatically disconnecting the communication between the first access device and the first personal device.

Preferably the method comprises automatically carrying out, after said step a.2), said step a.3) or said step a.4), the following step:

a.5) consulting a data structure that can be accessed by the first access device relating identifier registrations of several personal devices with a series of information including at least references to at least one application, or program, for one or more versions, to be sent from the first access device to the personal devices, for the purpose of finding out if said identifier of the first personal device, which is an identifier registration, is recorded in said data structure and, if this is the case, if the first personal device has said application installed therein and which version thereof it is.

Preferably if said finding out of said step a.5) offers as a result that the first personal device already has the latest version of said application installed therein, the method comprises disconnecting the communication between the first access device and the first personal device, automatically.

Preferably if said finding out of said step a.5) offers as a result that the first personal device does not have said application installed therein, or that it has a version thereof installed therein that is not the latest version, the method comprises automatically carrying out the following step:

a.6) finding out the characteristics or type of detected personal device, at least in reference to the brand and model thereof, or at least a percentage of probabilities that it is of a particular type, by means of an automatic interaction, or data exchange, between the first access device and the first personal device, and a corresponding analysis of said data, said data exchange being carried out invisibly for the user of the first personal device as only one or more communication modules thereof are used by the first personal device for said data exchange.

Preferably said step a.6) comprises running an identification algorithm by the first access device, and in that said data exchange or automatic interaction, as well said analysis thereof, occurs throughout running said identification algorithm.

Preferably running said identification algorithm comprises the following actions carried out sequentially and automatically:

sending a signal in the form of at least one question to said communication module of the first personal device requesting that it supplies at least part of an information contained in said communication module and established by the manufacturer as public and exportable information, receiving, by the access device, said requested information coming from the communication module of the first personal device, and analyzing at least part of said received information for the purpose of finding therein a direct indication of the type of personal device, including brand and model, which sent it Preferably running said identification algorithm comprises automatically:

processing said received information for obtaining a univocal indicator representative of said received information.

Preferably said information established by the manufacturer as public and exportable information is formed by a set of characters which are functional characters and/or manufacturer internal characters and/or characters relating to technical characteristics.

Preferably said identification algorithm is in accordance with the technology and protocol for which said communication in step a.3) has been set up, having been automatically selected out of a plurality of identification algorithms, each of which is associated to a different technology and protocol.

Preferably the method comprises carrying out an automatic learning process by means of running said identification algorithm for a plurality of personal devices of a known type, at least in relation to the brand and model, and the association of each of the corresponding univocal indicators out of the plurality of obtained univocal indicators with the type of personal device for which it has been obtained, at least in relation to the brand and model, creating a reference data structure from the data obtained and associated to one another that can be accessed by the first access device.

Preferably the method comprises automatically comparing the univocal indicator obtained for the first personal device with at least said plurality of univocal indicators obtained in said learning process and included in said reference data structure, and if there is a match, assigning the characteristics of the personal device of a known type, and associated to said univocal indicator which caused said match, to the first personal device, at least in relation to the brand and model, said assignment being the result of said finding out of step a.6).

Preferably if said comparison does not offer as a result an exact match but offers a high percentage of similarity between the univocal indicator of the first personal device and one of the obtained in said learning process and included in said reference data structure, the method comprises automatically assigning the characteristics of the personal device of a known type, and associated to said univocal indicator which caused said high percentage of similarity, to the first personal device, at least in relation to the brand and model, said assignment being the result of said finding out of step a.6).

Preferably if said comparison does not offer as a result an exact match or a high percentage of similarity with any of the univocal indicators obtained in said learning process and included in said reference data structure, the method comprises automatically assigning basic characteristics to the first personal device, said assignment being the result of said finding out of step a.6).

Preferably if said comparison does not offer as a result an exact match with any of the univocal indicators obtained in said learning process and included in said reference data structure, the method comprises automatically processing said received public information by means of a heuristic process, for the purpose of carrying out an approximate finding out in relation to the brand and model of the first personal device and making, also automatically, based on said approximate finding out, a hypothesis that the first personal device is of a particular brand and of a particular model, or a hypothesis that it is of a particular generic brand and/or model, and assigning it the characteristics of the device of the brand and model assumed by the hypothesis made.

Preferably the method comprises complementing said learning process by means of including in said reference data structure at least the data relating to the univocal indicators or to said hypotheses obtained for the first personal device and other similar ones, and using the resulting reference data structure for carrying out at least the mentioned comparison of univocal indicators.

Preferably the method comprises carrying out all the steps a.1) to a.6) between said first access device and a plurality of personal devices, obtaining as a response to said polling of step a.1) at least two responses in step a.2) in the form of two respective radio-frequency signals coming from two of said personal devices, having different technology and/or protocol, and simultaneously setting up in said step a.3) said individualized communication with at least the aforementioned two personal devices using the technologies and protocols with which said radio-frequency signals, response to the polling, have been emitted.

Preferably the method comprises obtaining as a response to said polling of step a.1) at least two responses in step a.2) in the form of two respective radio-frequency signals coming from said first personal device, having different technology and/or protocol, and simultaneously setting up in said step a.3) two individualized communication paths with said first detected personal device using for each of said paths one of the technologies and protocols with which each of said radio-frequency signals, response to the polling, have been emitted.

Preferably the method comprises carrying out all the steps a.1) to a.6) using a plurality of access devices, each of them located in a specific place and with respective applications, and a plurality of personal devices, in a manner similar to that carried out between the first access device and the first personal device.

Preferably the method comprises communicating said access devices with one another for exchanging between them at least part of the public and exportable information received by each access device and/or of the hypotheses and/or of the univocal indicators obtained as a result of the processing of said information by each access device obtained in their interaction with different personal devices.

Preferably the method comprises using a services provider server or a management device, communicated with said access devices, for accessing the univocal indicators of each of them and/or said hypotheses and/or the public and exportable information received by each access device from said plurality of personal devices, and for running a learning algorithm, particularly a genetic learning algorithm, for processing said received information for the purpose of complementing said finding out of said step a.6), and/or for carrying out an exchange between said access devices of at least part of the public and exportable information and/or of the hypotheses and/or of the univocal indicators contained in each of them.

Preferably the method comprises comprising carrying out after said step a.6) the following steps.

a.7) sending by said first access device a signal to at least the first personal device using the technology and protocol with which said communication has been set up in step a.3), containing an invitation to the user of the first personal device to receive said application, or program, whether in response to a petition sent by said user by means of his/her respective first personal device or automatically, and b) automatically sending to the first personal device of said user, if the latter has accepted said invitation, using the same technology and protocol used in step a.7), at least said application adapted to the characteristics or type of detected personal device, at least in relation to the brand and model, or at least a percentage of probabilities, found out in said step a.6), said adapted application including functionalities which the type of detected personal device is capable of managing, and c) recording and installing at least part of said application, or program, in a memory of the first personal device, automatically or after confirmation from the user.

Preferably said step b) comprises, prior to said sending of said adapted application, selecting said application adapted to the type of detected personal device from a plurality of applications adapted for different types of personal devices or adapting it by means of the manipulation of a generic application.

Preferably said invitation of said step a.7) refers to said selected application already adapted to the type of detected personal device or refers to said generic application to be adapted before being sent in said step b).

Preferably the method comprises said user running said application installed in his/her respective personal device, said run causing at least a data exchange between the first personal device and the first access device, and by comprising complementing said finding out of said step a.6) by means of the analysis of at least part of said data exchanged upon running said application.

Preferably said short-range radio communication is a wireless communication in a local area, and by comprising:

a) sending from said first access device located in a first specific place and suitable for bidirectionally communicating, a signal to at least one first of said personal devices, containing an invitation to the user of said first personal device to receive an application, or program, whether in response to a petition sent by said user by means of his/her respective first personal device or automatically;

b) sending at least said application, or program, to said first personal device of said user if the latter has accepted the invitation, and c) recording and installing at least part of said application, or program, in a memory of the first personal device automatically or after confirmation from the user.

Preferably said step b) further comprises sending multimedia information and/or at least one sub-application to the first personal device of said user, said application, or program, being suitable for managing said multimedia information and said at least one sub-application, for the purpose of supplying the user of the first personal device said and/or other multimedia information.

Preferably the method further comprises after said step c):

d) said user running said application installed in his/her respective first personal device, said run causing at least:

d1) managing multimedia information located in the first personal device and/or one or more multimedia sub-applications located in the first personal device for the purpose of supplying the user of the first personal device said and/or other multimedia information.

Preferably running said application further causes, during, prior to or after said step d1):

d2) setting up at least one temporary communication between the first personal device and said first access device, and d3) interactively managing multimedia information and/or one or more multimedia sub-applications available in the first personal device and/or in the first access device for the purpose of supplying the user of the first personal device said and/or other multimedia information, and enabling participation of said user.

Preferably when at least part of the multimedia information and/or the multimedia sub-application/sub-applications are located only in the first access device, said method comprises a step prior to said step d3) for sending said multimedia information and/or multimedia sub-application/sub-applications located in the first access device from the latter to the first personal device for the purpose of enabling said management of step d3).

Preferably the management in said step d3) of the information and/or sub-application/sub-applications located in the first access device and sent to the first personal device is carried out after the recording thereof, at least in part, in a volatile or non-volatile memory of the first personal device.

Preferably the management in said step d3) of the information and/or sub-application/sub-applications located in the first access device and sent to the first personal device is carried out immediately and sequentially upon reception thereof without needing a prior recording step.

Preferably said management of said sub-applications comprises enabling the user to select and run them by means of supplying to him/her indicators associated to said sub-applications.

Preferably when the first personal device already has said application, said sub-application/sub-applications and/or said multimedia information previously sent from the first access device installed and/or recorded in said memory/memories, the method comprises:

comparing it/them with the application, sub-application/sub-applications and/or multimedia information, respectively, located in the first access device, and updating it/them if the latter are newer and different at least in part, automatically or after confirmation and/or selection by the user, or substituting it/them.

Preferably the method comprises carrying out all the steps a) to d) for a plurality of access devices, each of them located in a specific place and with at least their own applications different, at least in part, from one another, and a plurality of personal devices, in a manner similar to that carried out between the first access device and the first personal device.

Preferably when several of said access devices, far enough away from one another such that their respective short-range radio coverage ranges do not overlap, form a group due to the fact that they share at least their respective applications, it comprises carrying out the steps subsequent to steps a) to c) between the first personal device and any of the components of said group regardless of which of the access devices of those belonging to said group has taken part in steps a) to c).

Preferably when a user simultaneously enters two short-range radio coverage ranges of two respective access devices, it comprises said user choosing through his/her corresponding personal device, which access device to set up communication with.

Preferably the supply of multimedia information and/or of indicators associated to sub-applications, or applications, is carried out by means of the respective display thereof in display means comprised in the first or in any of the personal devices.

Preferably said updating step involves the dynamic update of the graphic environment shown in said display means in relation to the multimedia information and/or to said indicators supplied.

Preferably the method comprises bidirectionally communicating at least two users with two respective personal devices through at least two of said access devices, each of said personal devices being within the respective short-range radio coverage range of one of said access devices, said short-range radio coverage ranges not overlapping and said access devices being communicated with one another by at least one type of communication network or a communication path that is different from the ones linking each personal device with a respective access device.

Preferably when one of said personal devices is communicated with one of said access devices or when it is running one of said applications or programs, it comprises blocking the wireless direct access to said personal device by another device, at least through the protocol by means of which it is communicated with said access device, being able to be accessed the personal device only through said access device in a limited manner.

Preferably said first central device is an actor personal device used by a user and said surrounding devices are target devices susceptible to being accessed by said actor personal device by means of said individualized communication set up in step a.3) for their remote use by said user.

Preferably said actor personal device is a portable device including telephone communication functions in addition to said short-range radio communication functions.

Preferably said target devices are at least one of the group comprising: personal devices, peripheral computer devices and access devices.

Preferably the method comprises:

carrying out said step a.2) for detecting and identifying at least two of said target devices by said actor personal device by means of the detection, in response to said polling, of at least two of said radio-frequency signals, each of them emitted automatically by one of said two target devices with technologies and/or protocols different from one another, and carrying out said step a.3) for setting up by means of the actor personal device an individualized communication with one of said at least two target devices, using at least the same technology and the same protocol with which the latter has sent said radio-frequency signal as a response to the polling, the target device with which to set up communication being automatically chosen by means of a prior selection step.

Preferably said prior selection step comprises automatically selecting said target device with which to set up communication, upon running an application or program in the actor personal device which requires a data flow that can be taken on by means of the use of the technology and the protocol with which the target device to be selected has responded.

Preferably said prior selection step comprises selecting said target device with which to set up communication according to the occupation status of the possible radio-frequency networks or of the communications existing in the surrounding environment of the actor personal device for different technologies and protocols, the target device which has responded to the polling with a technology and a protocol for which the occupation status of said possible networks or communications existing in the surrounding environment of the actor personal device is lower being selected.

Preferably said prior selection step comprises selecting said target device with which to set up communication according to the availability of the communication modules of different technologies and protocols of the actor personal device, the target device which has responded to the polling with a technology and a protocol for which the actor personal device has a communication module with a higher availability, or lower occupation, being selected.

In accordance with the present invention, there is provided a system of individualized short-range radio communication, applicable to communications which can include applications, or programs, and multimedia information, comprising:

surrounding devices, each of them with at least one communication module suitable for bidirectionally communicating by means of at least one short-range technology and at least one protocol, at least one of said surrounding being able to use a short-range technology and/or protocol different from the technology and/or protocol used by another of said surrounding devices for carrying out said bidirectional communication, and at least one first central device suitable for detecting radio-frequency signals of multiple technologies and protocols, and for setting up bidirectional short-range radio communications using said technologies and protocols, comprising an electronic system with at least:

a first communication module with:

a series of first communication sub-modules, each of them dedicated to automatically polling the environment of the first central device by means of each of said multiple technologies and protocols, for automatically detecting possible radio-frequency signals coming from said communication modules of said surrounding devices with at least one of said multiple technologies and at least one of said protocols, and for automatically acquiring identifier data in the form of at least one unique identifier, or identifier registration, of each surrounding device, included in said radio-frequency signals, a series of second communication sub-modules, associated to said first communication sub-modules intended for automatically setting up an individualized communication with each detected surrounding device using at least the same technology and the same protocol with which each one has emitted one of said radio-frequency signals, as a response to said polling, and a control module, with at least one analysis and processing unit adapted for controlling at least said first communication module of the first central device.

Preferably said first central device is a first access device located in a first specific place and said surrounding devices are personal devices, used by users, with respective communication modules suitable for carrying out said bidirectional short-range radio communication with at least said first access device when entering in a coverage range thereof, a first of said surrounding devices being a first personal device susceptible of being detected and identified by said first communication module of the access device, said control module of the access device being adapted for automatically finding out if said first personal device is adapted for receiving binary data.

Preferably that said first communication module is also intended for sending to said first personal device through said communication set up by means of at least said second sub-module, a signal in the form of an invitation to receive an application, or program, and in that said electronic system of the first access device also comprises:

a second communication module suitable for bidirectionally communicating with at least said first personal device if the latter is within its respective short-range radio coverage range, for sending to it at least said application, or program, from storage means, and receiving signals therefrom in the form of a petition and/or acceptance of being sent said application to it, and if the first personal device already has an application installed, setting up an interactive communication derived from the functionality of the application, if needed, and a control and storage module including at least one non-volatile memory comprising said storage means where at least said application, or program, is recorded, and where said identifier data of said first personal device and of other similar ones are recorded, if they have been previously acquired, and said control module with at least said analysis and processing unit, for also controlling, in addition to at least said first communication module, said second communication module for the purpose of setting up also an individualized communication with said first personal device using said second communication module, for sending said application, or program, said control module being adapted for managing said interactive communication derived from the functionality of the application, if needed, according to the analysis and processing of said petition and/or acceptance signals.

Preferably said control module comprises or has access to a data structure relating identifier registrations of several personal devices with a series of information including at least references to at least said application, or program, for one or more versions, to be sent from the first access device to the personal devices, the control module being adapted for automatically consulting said data structure for the purpose of finding out if said identifier registration of the first personal device is recorded in said data structure and, if this is the case, if the first personal device has said application installed and which version thereof it is.

Preferably said control module is also adapted for controlling said first communication module for carrying out an automatic data exchange with the communication module of the first personal device, and for carrying out a corresponding analysis and processing of said data for the purpose of finding out the characteristics or type of detected personal device, at least in reference to the brand and the model thereof, or at least a percentage of probabilities that it is of a particular type, said first communication module being adapted so that said data exchange is carried out invisibly for the user of the first personal device.

Preferably the control module is adapted for controlling said second communication module for automatically sending to the first personal device at least said application adapted to the characteristics or type of detected personal device, at least in relation to the brand and model, said adapted application including functionalities that the type of detected personal device is capable of managing.

Preferably the system comprises a plurality of access devices similar to the first access device, each of them located in a specific place and with at least their own applications different, at least in part, from one another, and a plurality of personal devices similar to the first personal device, said access devices being adapted for exchanging with one another at least part of the results obtained by each of them as a result of said findings out of types of detected personal devices.

Preferably the system comprises a services provider server or a management device bidirectionally communicated with said access devices, adapted for accessing the results of the findings out of types of detected personal devices carried out by each of them and/or said data exchanged and received by each access device from said plurality of personal devices, for running a learning algorithm, particularly a genetic learning algorithm, for processing said received information for the purpose of complementing said finding out of the characteristics or type of the detected personal devices, at least in reference to the brand and the model thereof, adapted also for supplying the result of said finding out to the access devices, and adapted for carrying out said exchange of results between said access devices through the services provider server.

Preferably said short-range radio communication is a wireless communication in a local area, and in that said system comprises:

a first personal device comprising at least one electronic system with at least one memory for storing at least one application, or program, in association with a processing unit and a communication module suitable for communicating locally, wirelessly and bidirectionally, at least one first access device located in a first specific place, comprising an electronic system with at least:

a first bidirectional communication module intended for automatic interaction with at least said first personal device with bidirectional communication capacity if the latter is within its respective coverage range, and applied to detect at least said first personal device and acquire identifier data thereof, sending to it a signal in the form of an invitation to receive an application, or program, and if it already has an application installed, sending to it a series of subscription notices or programmed information, a second communication module suitable for bidirectionally communicating with at least said first personal device if the latter is within its respective coverage range, for sending to it at least said application, or program, from storage means, and receiving signals therefrom in the form of a petition and/or acceptance that said application be sent to it, and if it already has an application installed, setting up an interactive communication derived from the functionality of the application, if needed, and a control and storage module including at least one non-volatile memory comprising said storage means where at least said application, or program, is recorded, and where said identifier data of said first personal device and of other similar ones are recorded, if they have been previously acquired, and a control module with at least one analysis and processing unit for controlling at least said first and second communication modules for sending said application or program, according to the analysis and processing of said petition and/or acceptance signals and for managing said interactive communication derived from the functionality of the application, if needed.

Preferably said first and second communication modules are suitable for communicating in parallel with several personal devices equivalent to said first personal device in a manner similar to how they communicate with said first personal device, by means of identical or different technologies and/or protocols.

Preferably said electronic system of said first access device comprises a third communication module suitable for bidirectionally communicating with a computer acting as a services provider server, with an internal network, with an external network and/or with a second access device, both the computer and the second access device comprising a respective communication module suitable for communicating with said third communication module of said first access device.

Preferably said third communication module comprises a series of communication sub-modules suitable for at least communicating through cable in a local area and/or through cable in an extensive area and/or wirelessly in a local area and/or wirelessly in an extensive area.

Preferably said non-volatile memory also has at least multimedia information and/or at least one sub-application recorded therein, and in that said first access device is suitable for sending to the first personal device said multimedia information and/or said at least one sub-application, in addition to said application, which is suitable for managing the multimedia information and the at least one sub-application, for the purpose of supplying to the user of the first personal device said and/or other multimedia information, and in that said non-volatile memory can be updated through said third communication module.

Preferably the system comprises a second access device acting as a master, in communication with said first access device, acting as a slave, with an electronic system comprising at least one respective communication module similar to the third communication module of the first access device and suitable for communicating with it, and a control and storage module similar to said control and storage module of the first access device but with greater capacity, said master access device being suitable for controlling and managing said slave access device and for increasing and/or updating, at least in part, the contents of said non-volatile memory of the slave access device.

Preferably said master access device is suitable for communicating with a plurality of access devices similar to said first access device, all of them acting as a slave with respect to the master access device, which with respect to all of them acts in the same or similar manner as it acts with respect to the first access device when the latter acts as a slave.

Preferably said electronic system of said second access device acting as a master also comprises other communication modules equivalent to the first and second communication modules of the first access device, for communicating with at least one personal device similar to said first personal device.

Preferably said communication module of said second access device acting as a master similar to said third communication module of the first access device, is suitable for bidirectionally communicating with a computer acting as a services provider server, said computer being suitable for updating, at least in part, the contents of at least one non-volatile memory included in said control and storage module of the second access device.

Preferably said first access device further comprises a routing module for connecting said second communication module with said third communication module.

Preferably said first access device further comprises an intermediate storage module between said second communication module and said non-volatile memory and/or between said second communication module and said routing module.

Preferably said first personal device and other similar devices also comprised in the system each comprises display means for the display of indicators associated to said applications, sub-applications and for the display of said and/or other multimedia information, and operation means for at least selecting and running said applications and/or sub-applications by their respective users, said display means being a display and said operation means being a keypad.

Preferably each of said technologies is one from the group including: Bluetooth®, Wi-Fi, NFC, UWB, Zigbee, Wireless USB and RFID.

Preferably said personal device is one from the group including: mobile telephones, electronic agendas, portable computers and portable audio and/or video players.

In accordance with the present invention, there is provided a central device applicable to individualized short-range radio communications which can include applications or programs and multimedia information, said central device being suitable for detecting radio-frequency signals of multiple technologies and protocols, and for setting up bidirectional short-range radio communications using said technologies and protocols, and comprising an electronic system with at least:

a first communication module with:
a series of first communication sub-modules each of them dedicated to automatically polling the environment of the first central device by means of each of said multiple technologies and protocols for automatically detecting possible radio-frequency signals coming from communication modules of surrounding devices with at least one of said multiple technologies and at least one of said protocols, and for acquiring identifier data in the form of at least one unique identifier, or identifier registration, of each surrounding device, included in said radio-frequency signals, a series of second communication sub-modules associated to said first communication sub-modules, intended for automatically setting up individualized communication with each detected surrounding device using at least the same technology and the same protocol with which each one has emitted one of said radio-frequency signals as a response to said polling, and a control module, with at least one analysis and processing unit adapted for controlling at least said first communication module of the first central device.

Preferably the device is an access device located in a first specific place and said surrounding devices are personal devices, used by users, with respective communication modules suitable for carrying out said bidirectional short-range radio communication with at least said access device when entering a coverage range thereof, said first surrounding device being a first personal device susceptible of being detected and identified automatically by said first communication module of the access device, said control module of the access device being adapted for automatically finding out if said first personal device is adapted for receiving binary data.

Preferably said first communication module is also intended for sending to said first personal device, through said communication set up by means of at least said second sub-module, a signal in the form of an invitation to receive an application, or program, and in that said electronic system of the access device also comprises:

a second communication module suitable for bidirectionally communicating with at least said first personal device if the latter is within its respective short-range radio coverage range, for sending to it at least said application, or program, from storage means, and receiving signals therefrom in the form of a petition and/or acceptance that said application be sent to it, and if it already has an application installed, setting up an interactive communication derived from the functionality of the application, if needed, and a control and storage module including at least one non-volatile memory comprising said storage means, where at least said application, or program, is recorded, and where said identifier data of said first personal device and of other similar ones are recorded, if they have been previously acquired, and said control module with at least said analysis and processing unit for also controlling, in addition to at least said first communication module, said second communication module for the purpose of setting up also an individualized communication with said first personal device using said second communication module for the purpose of sending said application or program, said control module being adapted for managing said interactive communication derived from the functionality of the application, if needed, according to the analysis and processing of said petition and/or acceptance signals.

Preferably said control module comprises or has access to a data structure relating identifier registrations of several personal devices with a series of information including at least references to at least said application or program, for one or more versions to be sent from the access device to the personal devices, the control module being adapted for automatically consulting said data structure for the purpose of finding out if said identifier registration of the first personal device is recorded in said data structure and, if this is the case, if the first personal device has said application installed and which version thereof it is.

Preferably said control module is also adapted for controlling said first communication module for carrying out an automatic data exchange with the communication module of the first personal device and for carrying out a corresponding analysis and processing of said data for the purpose of finding out the characteristics or type of detected personal device, at least in reference to the brand and the model thereof, or at least a percentage of probabilities that it is of a particular type, said first communication module being adapted so that said data exchange is carried out invisibly for the user of the first personal device.

Preferably the control module is adapted for controlling said second communication module for automatically sending to the first personal device at least said application adapted to the characteristics or type of detected personal device, at least in relation to the brand and model, said adapted application including functionalities that the type of detected personal device is capable of managing.

Preferably said short-range radio communication is a wireless communication in a local area, and in that said electronic system comprises at least:

a first bidirectional communication module intended for automatic interaction with at least one first personal device with bidirectional communication capacity, if the latter is within its respective coverage range, and applied to detect at least said first personal device and to acquire identifier data thereof, sending it a signal in the form of an invitation to receive an application, or program, and if it already has an application installed, sending to it a series of subscription notices or programmed information, a second communication module suitable for bidirectionally communicating with at least said first personal device, if the latter is within its respective coverage range for sending to it at least said application, or program, from storage means, and receiving signals therefrom in the form of a petition and/or acceptance that said application be sent to it, and if it already has an application installed, setting up an interactive communication derived from the functionality of the application, if needed, and a control and storage module including at least one non-volatile memory comprising said storage means, where at least said application, or program, is recorded and where said identifier data of said first personal device and of other similar ones are recorded, if they have been previously acquired, and a control module with at least one analysis and processing unit, for controlling at least said first and second communication modules for sending said application, or program, according to the analysis and processing of said petition and/or acceptance signals and for managing said interactive communication derived from the functionality of the application if needed.

Preferably said first and second communication modules are suitable for communicating in parallel with several personal devices equivalent to said first personal device in a manner similar to how they communicate with said first personal device by means of identical or different technologies and/or protocols.

Preferably said electronic system comprises a third communication module suitable for bidirectionally communicating with a computer acting as services provider server, with an internal network, with an external network and/or with another access device.

Preferably said third communication module comprises a series of communication sub-modules suitable for at least communicating through cable in a local area and/or through cable in an extensive area and/or wirelessly in a local area and/or wirelessly in an extensive area.

Preferably said non-volatile memory also has at least multimedia information and/or at least one sub-application recorded therein, and in that said access device is suitable for sending to the personal device said multimedia information and/or said at least one sub-application, in addition to said application which is suitable for managing the multimedia information and the at least one sub-application, for the purpose of supplying to the user of the first personal device said and/or other multimedia information.

Preferably the device further comprises a routing module for connecting said second communication module with said third communication module.

Preferably said routing module includes a control system suitable for managing and controlling at least part of the communications circulating therethrough.

Preferably said routing module is associated to said control and storage module which is suitable for managing and controlling at least part of the communications circulating therethrough.

Preferably the device further comprises an intermediate storage module between said second communication module and said routing module and/or between said second communication module and said non-volatile memory, for storing temporarily information.

Preferably said intermediate storage module further comprises a control system suitable for managing and controlling the temporarily stored information, as well as its transmission and reception.

Preferably the device is an actor personal device used by a user and in that it is adapted for carrying out said detection, identification and setting up of an individualized communication with surrounding devices which are target devices susceptible to being accessed by said actor personal device, by means of said individualized communication, for their remote use by said user.

Preferably said actor personal device is a portable device including telephone communication functions in addition to said short-range radio communication functions.

Preferably it is adapted for carrying out said detection, identification and setting up of an individualized communication with target devices which are at least one from the group comprising: personal devices, peripheral computer devices and access devices.

Preferably said control module is adapted for:

receiving and processing at least two of said radio-frequency signals coming from two respective target devices with technologies and/or protocols different from one another, and detected by two of said first dedicated communication sub-modules, and for controlling said second communication sub-modules for automatically selecting from the second communication sub-modules suitable for setting up communication with said technologies and/or protocols of said two radio-frequency signals, a second sub-module and setting up, by means of said selected second sub-module, said individualized communication with one of said at least two target devices, using at least the same technology and the same protocol with which it has sent said radio-frequency signal as a response to the polling.

Preferably said first communication sub-modules and said second communication sub-modules form a single communication sub-module intended for carrying out the functions of both, the first and the second sub-modules, in an alternating manner.

Preferably said first communication sub-modules and said second communication sub-modules form a single communication sub-module intended for carrying out the functions of both, the first and the second sub-modules, in an alternating manner.

In a third aspect, a central device suitable for forming part of the system proposed according to the second aspect of the invention is also proposed.

The fact of having a central device, proposed by the present invention, which is able to adapt to the communication capacities of a plurality of surrounding devices, and communicating with each of them in "their language" in an individualized manner, offers a wide field of uses that may benefit from it.

In the present application, two main lines of utilities are proposed, a first extensively described line for the three aspects of the present invention, and a second not so extensively described line.

The parts of the present specification making reference to the aforementioned second line of utilities will be duly indicated hereinafter as belonging to said second line of utilities, belonging to the aforementioned first line of utilities the parts of the specification the content of which is not specified which line of utilities it belongs to.

For the embodiments included in the first line of utilities, the aforementioned first central device is a first access device located in a first specific place and said surrounding devices are personal devices, such as mobile telephones, used by users, suitable for carrying out said bidirectional short-range radio communication with at least said first access device, when entering in a coverage range thereof, said first surrounding device being a first personal device detected and identified in said step a.2).

The communication is set up in an individualized manner for each personal device between the latter and a respective access device (said first access device or the like) when the user of the personal device enters an area or premises in which the access device is located, in other words within its coverage area.

Generally several users with respective personal devices will enter said premises in which the access device is located, and the access device will detect all of them, will find out which technologies and protocols they can communicate with, and will set up an individualized communication with each of them in "their language" of communication, or "languages" with which they are able to communicate with more than one technology and/or protocol, if needed.

In addition to individualizing the communication in reference to the technology and protocol to be used according to the present invention (in its three aspects) for several preferred embodiments, each access device is able to automatically find out the type of detected personal device, at least in reference to the brand and model, or to set up a percentage of probabilities that it is of a particular type. In other words if the personal device is a mobile telephone, such as a Nokia 8210, for example, the access device tries to find out the brand and model thereof, establishing that the detected mobile telephone is really a Nokia 8210, for a preferred case in which said finding out is completely successful, or establishing said percentage of probabilities or approximation, if the finding out is not completely successful.

In the section relating to the detailed description of embodiments of the present specification, it will be explained how the mentioned findings out of the types of detected personal device are carried out by means of the present invention and how the access device attempts said finding out if it considers it necessary according to a series of criteria, one of which being that the detected personal device is able to receive binary data or that, after consulting the identifier acquired in step a.2) according to the proposed method in a data structure, the access device considers it is necessary to carry out said finding out for reasons which will be explained below.

By means of the arrangement of several similar access devices, or at least with basic functionalities, each of them in a specific place, different short-range communication areas are established, representative for example of premises or different floors of the same premises, such as a shopping center. When the user enters one of said areas for the first time, after the access device thereof detects its respective personal device and if it considers it necessary to find out with the greatest possible accuracy its brand and model, it offers the possibility of installing a multimedia application in, for example, his/her mobile telephone, and this is carried out after acceptance given by the user. Said offering can be carried out automatically or after a petition from said user.

Said application is generally adapted to the context, i.e. the place where the access device which has sent it to the user is located, and it preferably incorporates multimedia information and sub-applications in the form of menus offered to the user through, for example, a display of his/her personal device for the selection and run thereof and to then be able to access certain services, such as product advertising, games, chats, interactive television, etc.

If the access device has found out exactly the brand and model of the personal device, the application sent to it (if the user accepts the invitation) is adapted to said specific brand and model, said adapted application including functionalities that the type of detected personal device is able to manage.

Said adaptation takes into consideration, for example, the size of the display of the personal device, the operative system it uses, the Java version it has available, the processing and/or memory capacity it has, etc., the expression "individualized communication" obtaining greater meaning for these cases since the individualization not only makes reference to communication technology and protocol, but also to the aforementioned adaptation of the application to each of the detected personal devices the brand and model of which the access device has found out.

For some cases, as indicated above, the result of said finding out is not completely successful, because as a result it only offers an approximation to the brand and the model of the detected personal device, which for example for the aforementioned case of detecting a Nokia 8210 could consist of finding out that the mobile telephone is a Nokia of the 8000 series. For these cases the adaptation of the application is not that precise, although it can also be carried out taking into account, for this example, the characteristics common to all Nokia telephones of the 8000 series. For the cases in which the finding out does not offer results with certain reliable assurances it also contemplates sending a basic application to the personal device.

Once the user leaves the premises in which the access device which supplied him/her with said application is arranged, such user has the possibility to continue accessing such application, and therefore the aforementioned menus, but without the possibility of interaction that was available while he/she was within the coverage area of the access device, accessing only the contents recorded in the last interaction.

If the user returns to the same premises, the application, sub-applications and information in the form of associated contents are automatically updated from the access device, where appropriate. The associated menu structure is also updated dynamically.

By means of the existence of a plurality of access devices, each one located in a respective place or local area and each of them with its own applications, sub-applications and multimedia information, different at least in part, each user is offered the possibility of installing such own applications (and associated elements) when such user enters, for example, the premises of one of said access devices.

In other words, when the same user who has installed a certain application (for example in relation to movies if he/she enters a movie theater) from a certain access device, enters the domains of another access device, he/she has the possibility of installing another application in relation to the premises he/she has entered (for example in relation to vehicles if he/she has entered a car dealership), or of updating it if he/she had already been there before, completely changing the appearance of the graphic environment shown on the display of his/her personal device with menus and sub-menus adapted to the new context in which the user is located.

The applications that the users install in their respective personal devices when they enter a specific area or premises for the first time can have a structure based on XML, for example, or other formats which allow being adapted dynamically during the mentioned update process to the latest version available in the access device, if this version is different from the one installed in the personal device.

With the present invention a user can be integrated in the environment surrounding him/her from the dynamic adaptation of the structure of an application which is run in his/her personal device, allowing the user to enjoy different and quite varied experiences according to the context in which he/she is located.

Such dynamic adaptation of the application of the user's personal device according to the context or CADACA (Context Aware Dynamic Application Channel Adaptation) allows the mentioned update depending not only on the location of the access device, but also on other parameters such as the day and time, user preferences, the provider offering the service or user-related data that the commercial area has in databases, such as, for example, CRM (customer relationship management), etc.

The adaptation of the application or of the menu structure discussed above (both the adaptation relating to the context and the adaptation carried out according to the type-brand and model in the best of cases—of the detected personal device) can consist, among other actions, of adding, changing and removing functionalities, customizing application icons to those selected by the establishment where the access device is located, changing the background colors in the display of the personal device, text fonts, updating their static contents (those residing in the application although there is no available connection to the access device) and adding new links to dynamic contents (those residing in the access device) which will only be available when the users have a connection with the access device.

Each access device can set up several individual communication channels, one or more per personal device, and therefore offer simultaneously different applications and/or contents to different users, being able to use a different communication technology and/or protocol for each communication channel. For example a user could be communicated by means of Bluetooth® technology with an access device while another user communicates through "Wi-Fi", the access device being agnostic with respect to the technology to be used.

Different arrangements or configurations can be carried out by means of different combinations made with the access devices, such as those consisting of clustering them by type of premises, thus sharing at least one main application, although said premises are very far from one another.

Another combination includes communicating different access devices through any type of network, or communication path, whether wireless or not, of local, middle or extensive area, as well as constructing different systems incorporating master access devices with slave access devices, etc.

With one of said combinations it is possible for two or more users to communicate with one another through an access device or more than one communicated to one another, for example for chat-related applications.

Once a communication is set up between a personal device and an access device, access to said personal device is blocked through the communication technology and the protocol used for said set up communication, unless going through the access device with which it is communicated as a bridge. The arrival of information commonly known as spam, or sending of unwanted or intrusive information, is thus effectively fought.

The set up and maintenance of the aforementioned communication channels is carried out only when it is needed and transparently for the user, whether it is because the user is being sent information or because the user is using an interactive application involving a constant bidirectional flow of information. Usually the application installed in the personal device is responsible for setting up or cutting off the communication when it considers it necessary. This results in a considerable saving in energy, which is very important in relation to batteries of, for example, mobile telephone.

The content of the access devices is also frequently updated by means of a computer, with the suitable software and automatic systems supporting the actions carried out (commonly known as "backoffice").

Such a computer can control a plurality of access devices in different degrees depending on the level of functionalities that each of the access devices can carry out, not only for updating their contents but also for monitoring them, recording their movements, collaborating in the mentioned brand and model findings out, exchanging the results of said findings out, and even supplying them additional information required by an application when the user runs it in his/her respective personal device.

The possible configurations or arrangements are quite varied, and some of them will be explained in greater detail in the following sections of the present specification.

In relation to the aforementioned second line of utilities, for the embodiments included in said second line the central device is an actor personal device used by a user and the surrounding devices are target devices susceptible to being accessed by said actor portable device by means of said individualized communication set up in step a.3) for their remote use by said user.

For a preferred embodiment, said actor personal device is a portable device including telephone communication functions in addition to said short-range radio communication functions, such as a mobile telephone, and the target devices are for example: other personal devices, peripheral computer devices, access devices, etc.

In this case relating to said second line of utilities, the proposed method comprises:

carrying out said step a.2) for detecting and identifying two or more of said target devices by said actor portable device, by means of the detection, in response to said polling, of two or more of said radio-frequency signals, each of them emitted automatically by one of said target devices, with different technologies and/or protocols, and carrying out said step a.3) for setting up, by means of the actor portable device, an individualized communication with one of said target devices, using the same technology and the same protocol with which such device has sent said radio-frequency signal as a response to the polling, automatically choosing the target device with which to set up communication by means of a prior selection step.

In other words, for this case the user has the central device, such as a mobile telephone, which when it detects two target devices, such as two printers using different technologies and/or protocols, it automatically chooses which of them to communicate with taking into account a series of criteria, such as the criteria related to data flow, occupation status of the networks, availability, etc.

In reference to the first aforementioned criterion, for said case the proposed method comprises carrying out said prior selection step for selecting the target device with which to set up communication automatically when an application, or program, is run in the actor portable device requiring a data flow that can be taken on by means of the use of the technology by means of the technology and protocol which the target device to be selected has responded with. An example would be the case in which said application was a program that required exchanging frames or sections of video in real time, and out of the detected target devices it would select the one having the ability to communicate with a technology and protocol that allowed carrying out said exchange with higher success assurances.

As regards the second aforementioned criterion, for said case the method proposed by the present invention comprises carrying out said prior selection step for selecting the target device with which to set up communication, according to the occupation status of the possible radio-frequency or communication networks existing in the surrounding area of the actor portable device for different technologies and protocols, being selected the target device which has responded to the polling with a technology and protocol for which the occupation status of said possible networks or communications existing in the surrounding area of the actor portable device is lower.

Finally, for the third aforementioned criterion, the method comprises carrying out said prior selection step for selecting the target device with which to set up communication, according to the availability of the communication modules of different technologies and protocols of the actor personal device, the target device which has responded to the polling with a technology and a protocol for which the actor portable device has a communication module with a higher availability, or lower occupation, being selected.

BRIEF DESCRIPTION OF THE DRAWINGS

The foregoing features as well as others will be better understood from the following detailed description of several embodiments in reference to the attached drawings in which.

DETAILED DESCRIPTION OF SEVERAL EMBODIMENTS

Figure 1:
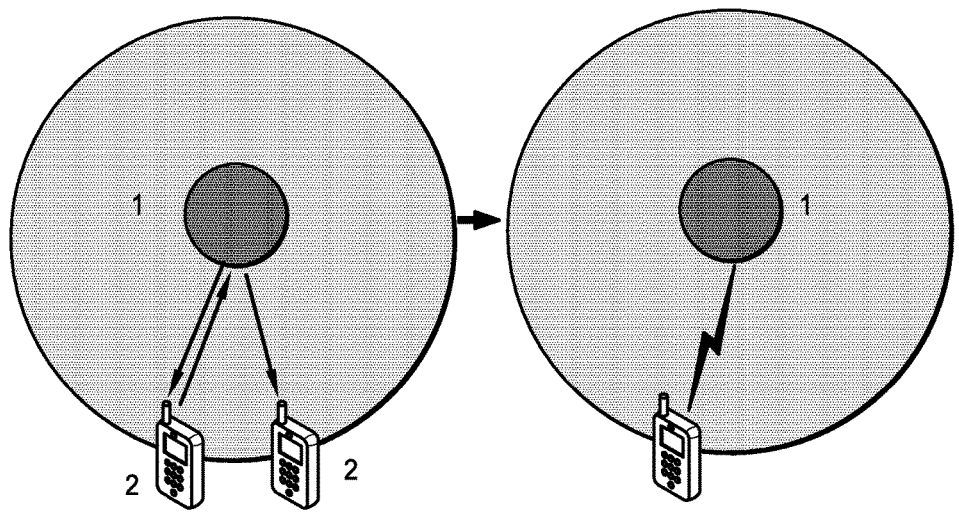
FIG. 1 shows a schematic representation of a basic arrangement of the system and method proposed by the present invention, showing on the left the polling from an access device of its surrounding area in which two personal devices are located, and on the right shows the communication set up between said access device and one of said personal devices according to one embodiment.

In a first aspect, the present invention relates to an individualized short-range radio communication method, applicable to communications which can include applications, or programs, and multimedia information, between (see FIGS. 1 to 5, FIG. 8 and FIG. 10 for different embodiments):

a first central device 1, 101 suitable for detecting radio-frequency signals of multiple technologies and protocols, and for setting up bidirectional short-range radio communications using said technologies and protocols, and a plurality of surrounding devices 2, 102, each of them suitable for bidirectionally communicating by means of at least one short-range technology and at least one protocol, there being surrounding devices 2, 102 with short-range technologies and/or protocols different from one another, such as, for example, a surrounding device 2, 102 using Bluetooth® 1.1, another one using Bluetooth® 1.2, another one Wi-Fi, etc.

Although the method is applicable to the individualized communication among multiple surrounding devices and multiple central devices, as will be explained below, the following steps refer to the detection and subsequent communication between the aforementioned first central device 1, 101 and a first surrounding device 2, 102 (out of the mentioned plurality of surrounding devices 2, 102) for the sake of clarity, although the steps can obviously be extrapolated to the remaining individual communications.

The proposed method comprises sequentially carrying out the following steps, automatically:

a.1) polling by means of said first central device 1, 101 a surrounding area thereof, by means of several or all of said multiple technologies and protocols, using a series of detection modules, each of which is dedicated to operating with one of said technologies and one of said protocols used in said polling for detecting possible radio-frequency signals coming from said surrounding devices 2, 102 with at least one of said multiple technologies and at least one of said protocols, a.2) detecting and identifying, by said first central device 1, 101, at least one first of said surrounding devices 2, 102 through the picking up of at least one of said radio-frequency signals emitted automatically by said first surrounding device 2, 102 (such as, for example, by the simple fact of having its Bluetooth® module activated, if this is the case, or as a direct recognition response of said polling) by means of one of said multiple technologies and one of said protocols, said radio-frequency signal including at least one unique identifier (such as, for example, a Bluetooth® registration, if this is the case) of said first surrounding device 2, 102 which has sent the radio-frequency signal, and a.3) setting up by means of the first central device 1, 101, an individualized communication with said detected surrounding device 2, 102 using at least the same technology and the same protocol with which said radio-frequency signal, in response to the polling, has been emitted.

As explained in a previous section, preceding steps a.1) to a.3) of the method, or in other words, a central device suitable for carrying them out, can be used for multiple uses, which have been previously divided into two main lines.

For the embodiments included in the aforementioned first line of utilities, referred to in FIGS. 1 to 5 and FIG. 8, the proposed method is applied to communications for which said first central device 1 is a first access device 1 located in a first specific place and said surrounding devices 2 are personal devices 2, used by users, suitable for carrying out said bidirectional short-range radio communication with at least said first access device 1 when entering in a coverage range thereof, said first surrounding device 2 being a first personal device 2 detected and identified in said step a.2).

For the depicted embodiments, such personal devices 2 are mobile telephones, although the present invention is applicable for any other type of personal device having the necessary capacities, such as electronic agendas, portable computers, portable audio and/or video players, etc.

For said embodiments relating to the communication between access devices 1 and personal devices 2, the method comprises after said step a.3), for an embodiment immediately afterwards, and for other embodiments after another step or other steps after step a.3), carrying out the following step automatically:

a.4) finding out if said first personal device 2 is adapted for receiving binary data through said individualized communication set up with said first access device 1, said finding out being carried out:

by means of the processing, by the first access device 1, of said radio-frequency signal emitted by the first personal device 2 acquired by the first access device 1 if such signal includes sufficient information so that its processing produces said finding out, or, alternatively, by means of the sending, by the first access device 1, of a signal in the form of a question to the first personal device 2, the negative response of which, in the form of a corresponding signal, or the absence thereof after a certain period of time, is indicative that the first personal device 2 is not suitable for receiving binary data, and an affirmative response, in the form of a corresponding signal, is indicative that it can receive binary data.

If said finding out of said step a.4) offers as a result that the first personal device 2 is not suitable for receiving binary data, the method comprises automatically disconnecting the communication between the first access device 1 and the first personal device 2, because this is indicative that the personal device 2 cannot receive the multimedia applications which are the basis of the proposed method for the first line of utilities, therefore it makes no sense to maintain communication with such personal device 2.

The proposed method comprises automatically carrying out, after said step a.2), said step a.3) or said step a.4), the following step:

a.5) consulting a data structure that can be accessed by the first access device 1 relating identifying registrations of several personal devices 2 with a series of information including at least references to at least one application, or program, for one or more versions, to be sent from the first access device 1 to the personal devices 2, for the purpose of finding out if said identifier of the first personal device 2, which is an identifier registration, is recorded in said data structure and if this is the case, if the first personal device 2 has said application installed and which version thereof it is.

If said finding out of said step a.5) offers as a result that the first personal device 2 already has the latest version of said application installed, the method comprises automatically disconnecting the communication between the first access device 1 and the first personal device 2 because it is no longer of interest to maintain the automatic communication with such personal device 2, as the access device 1 does not have a more updated application to send. Nevertheless, as will be explained below in the present specification, the user of the first personal device 2 can set up a communication with the first, or another, access device 1 when running the application installed in his/her personal device 2 for receiving and/or exchanging multimedia information, but such communication is no longer automatic but rather manually initiated by the user.

If, in contrast, the finding out of said step a.5) offers as a result that the first personal device 2 does not have said application installed, or it has a version thereof installed that is not the most recent, the method comprises automatically carrying out the following step:

a.6) finding out the characteristics or type of detected personal device 2, at least in reference to the brand and the model thereof, or at least a percentage of probabilities that it is of a particular type, by means of an automatic interaction, or data exchange, between the first access device 1 and the first personal device 2, and a corresponding analysis of said data, said data exchange being carried out in an invisible manner for the user of the first personal device 2 as only one or more communication modules thereof are used by the first personal device 2 for said data exchange. For a preferred embodiment, the method proposed by the first aspect of the present invention comprises carrying out said step a.6) by means of running an identification algorithm by the first access device 1, said data exchange or automatic interaction as well as said analysis thereof occurring throughout running said identification algorithm.

Running said identification algorithm comprises the following actions carried out sequentially and automatically:

sending a signal in the form of one or more questions to said communication module of the first personal device 2, requesting that it supplies at least part of an information contained in said communication module and established by the manufacturer as public and exportable information (inside of the known Bluetooth® chip for the case of using such technology), receiving, by the access device 1, said requested information coming from the communication module of the first personal device 2, and analyzing at least part of said received information for the purpose of finding therein a direct indication of the type of personal device 2, including brand and model, which sent it, because even though it is not very common, there are manufacturers incorporating said direct indication in said public and exportable information.

Said public and exportable information is usually unintelligible gibberish with the naked eye, containing information of a diverse intermixed type, formed by a set of characters which are functional characters and/or manufacturer internal characters and/or characters relating to technical characteristics, although, as previously mentioned, it sometimes contains a direct indicator of the brand and model, for example, of the mobile telephone 2 containing it.

Running said identification algorithm also comprises automatically:

processing said received information for obtaining a univocal indicator representative of said received information.

For another embodiment, running the identification algorithm only causes the aforementioned processing for obtaining the aforementioned univocal indicator, the actions related to the aforementioned sending of questions and the subsequent reception of responses containing the mentioned public and exportable information and the mentioned analysis for obtaining said direct indication being carried out automatically and prior to running the identification algorithm.

For yet another embodiment, the identification algorithm comprises both the aforementioned processing for obtaining the aforementioned univocal indicator and the mentioned analysis for obtaining said direct indication.

The aforementioned identification algorithm is in accordance with the technology and protocol for which said communication in step a.3) has been set up, having been automatically selected according to the proposed method out of a plurality of identification algorithms, each of which is associated to a different technology and protocol.

The proposed method comprises carrying out an automatic learning process by means of running said identification algorithm for a plurality of personal devices 2 of a known type, at least in relation to the brand and model, and the association of each of the corresponding univocal indicators out of the plurality of obtained univocal indicators with the type of personal device 2 for which it has been obtained, at least in relation to the brand and model, creating a reference data structure from the data obtained and associated to one another that can be accessed by the first access device 1.

Said learning process comprises being carried out previously for a plurality of devices of known types and additionally for the personal devices detected at all times, the univocal indicator of which has been obtained, i.e. in a phase prior to putting an access device 1 into operation, the latter is "trained" by introducing in its coverage field a series of, for example, mobile telephones 1 of known brands and models, generating an initial data structure relating each of said mobile telephones with its univocal indicator, after which point said access device 1 is put into operation in a specific place, enabling its access to said place for users of unknown personal devices 1 to be detected which, once they are detected and respective univocal indicators are obtained, the mentioned data structure is being complemented by means of the introducing therein the data relating to the detected personal devices 2 with their respective univocal indicators.

Once said reference data structure (at least the initial one) is generated, the proposed method comprises automatically comparing the univocal indicator obtained for the first personal device 2 with at least said plurality of univocal indicators obtained in said learning process and included in said reference data structure, and if they match, assigning the characteristics of the personal device 2 of a known type and associated to said univocal indicator which caused said match, to the first personal device 2, at least in relation to the brand and model, said assignment being the result of said finding out of step a.6).

If said comparison does not offer as a result an exact match but offers a high percentage of similarity between the univocal indicator of the first personal device 2 and one of those obtained in said learning process and included in said reference data structure, the method comprises automatically assigning the characteristics of the personal device 2 of a known type and associated to said univocal indicator which has caused said high percentage of similarity to the first personal device 2, at least in relation to the brand and model, said assignment being the result of said finding out of step a.6).

If said comparison does not offer as a result an exact match or a high percentage of similarity with any of the univocal indicators obtained in said learning process and included in said reference data structure, the method comprises automatically assigning basic characteristics to the first personal device 2, said assignment being the result of said finding out of step a.6).

For another embodiment if said comparison does not offer as a result an exact match with any of the univocal indicators obtained in said learning process and included in said reference data structure, the method comprises automatically processing said received public information by means of a heuristic process for the purpose of carrying out an approximate finding out in relation to the brand and model of the first personal device 2 and making, also automatically, based on said approximate finding out, a hypothesis that the first personal device 2 is of a particular brand and of a particular model or a hypothesis that it is of a particular generic brand and/or model, and assigning it the characteristics of the device of the brand and model assumed by the hypothesis made.

As previously mentioned, the method comprises complementing said learning process by means of including in said reference data structure the data relating to the univocal indicators or also to said hypotheses obtained for the first personal device 2 and other similar ones, and using the resulting reference data structure for carrying out the mentioned comparison of univocal indicators.

As previously mentioned, the explanation of the steps of the proposed method for a first access device 1 and a first personal device 2 to be detected has been done for the purpose of better understanding such steps, but the proposed method comprises carrying out all the steps a.1) to a.6) between an access device 1 and a plurality of personal devices 2, obtaining as a response to said polling of step a.1) a series of responses, in step a.2), for example two, in the form of respective radio-frequency signals coming from two of said personal devices 2, having a different technology and/or protocol (for example Bluetooth® and Wi-Fi), and simultaneously setting up in said step a.3) said individualized communication with at least the aforementioned two personal devices 2 using the technologies and protocols with which said radio-frequency signals, response to the polling, have been emitted. In other words, a single access device 1 can detect and communicate with two or more personal devices 2 at the same time with different technologies and/or protocols by means of the application of the proposed method.

For another embodiment, the method comprises obtaining as a response to said polling of step a.1) two or more responses in step a.2) in the form of two respective radio-frequency signals coming from said first personal device 2, having different technology and/or protocol, and simultaneously setting up in said step a.3) two individualized communication paths with said first detected personal device 2 using for each of said paths one of the technologies and protocols with which each of said radio-frequency signals, response to the polling, have been emitted. In other words, a single access device 1 can detect and communicate with a personal device 2 through two (or more) communication paths having different technologies and/or protocols by means of the application of the proposed method, a case which is applicable, for example, to mobile telephones having a Bluetooth® communication module and a Wi-Fi communication module and being able to use both at the same time.

The proposed method comprises carrying out all the steps a.1) to a.6) using a plurality of access devices 1, each of them located in a specific place and with respective applications, and a plurality of personal devices 2 in a manner similar to that carried out between the first access device 1 and the first personal device 2.

For one embodiment, the method comprises communicating said access devices 1 with one another for exchanging between them part or all of the public and exportable information received by each access device 1 and/or the hypotheses and/or the univocal indicators obtained as a result of the processing of said information by each access device 1 obtained in their interaction with different personal devices 2. This thereby achieves that the learning to which each access device 1 has been subject, and which, as explained above, has been used to increase and improve said reference data structure, is also useful for increasing and improving the reference data structures of the remaining access devices 1, thus achieving uniformity in the level of "knowledge" of all the access devices 1, regardless of the fact that they are located in a place where there are few users or in a place with heavy user traffic.

Figure 9:
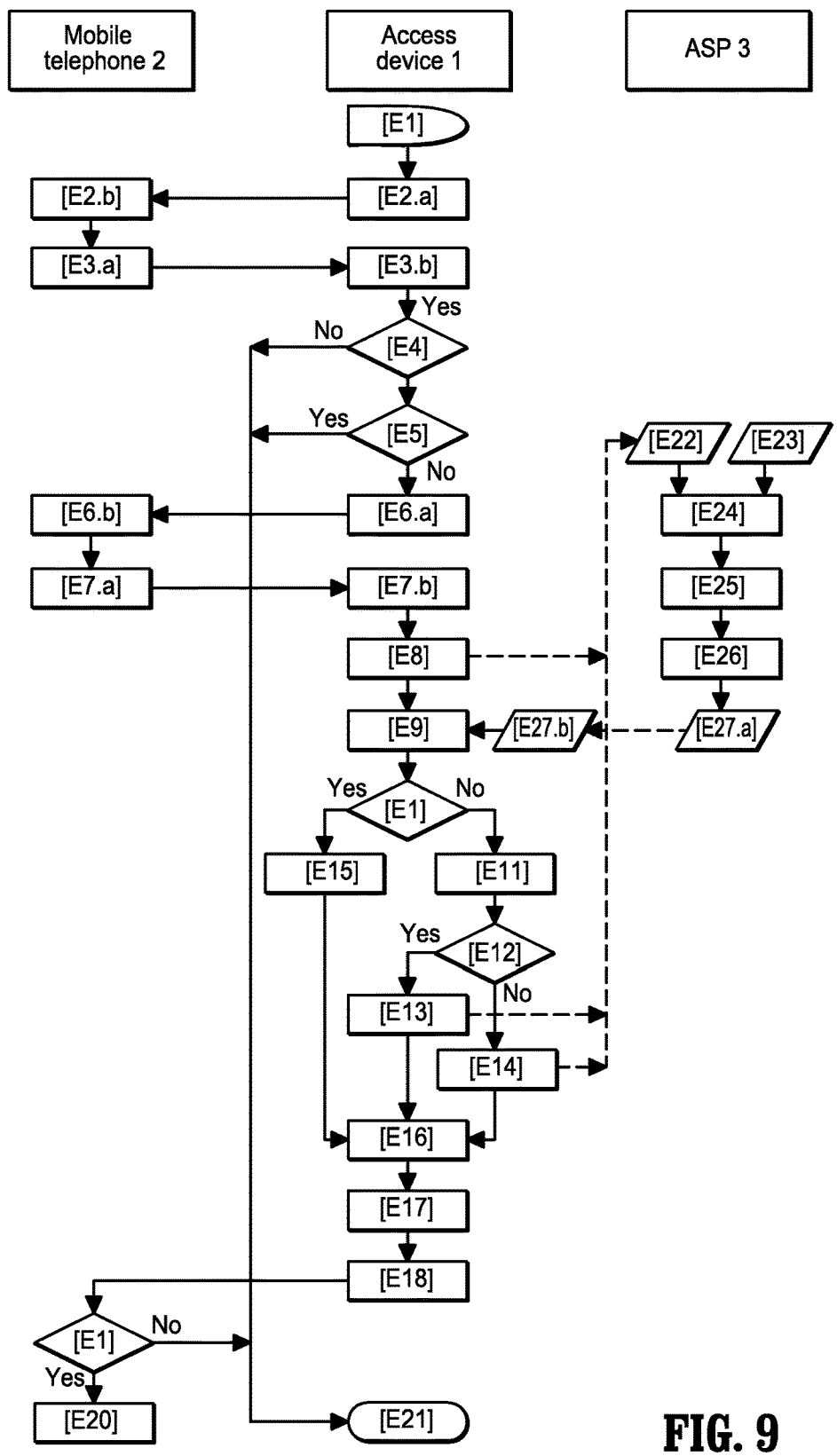
FIG. 9 shows a flow chart representing part of the method proposed by the first aspect of the present invention, for one embodiment.

For the same purpose of exchanging knowledge, the method proposed by the first aspect of the present invention comprises using a management device or a services provider server 3 (or application server provider, ASP, as indicated in the embodiment depicted in FIG. 9) communicated with said access devices 1 for accessing the univocal indicators of each of them and/or said hypotheses and/or the public and exportable information received by each access device 1 from said plurality of personal devices 2, and for running a learning algorithm, particularly a genetic learning algorithm, for processing said received information for the purpose of complementing said finding out of said step a.6), and/or for carrying out an exchange between said access devices 1 of at least part of the public and exportable information and/or of the hypotheses and/or of the univocal indicators contained in each of them, as well as of the different data structures.

For one embodiment comprising using a system such as the one described in the preceding paragraph, i.e., a services provider server 3 or a management device, intercommunicated with a series of access devices 1, the reference data structure or structures could be generated in the server 3 both in the initial step of the mentioned learning process and in the subsequent update with the new data obtained from the different access devices 1, and said data structure being copied, for example in the form of a table, in the access devices 1 so that they can use it as previously explained. In this case, the aforementioned learning process generating the initial reference data structure would be carried out in the server 3, the mentioned prior "training" of the access devices 1 one by one not being necessary, rather simply "training" the server 3 and dumping the generated table from the latter into the access devices 1 being necessary.

Once the type of detected personal device 1 has been found out insofar as it is possible, i.e. after said step a.6), the method comprises carrying out the following steps explained by the reasons previously set forth for a first access device 1 and for a first personal device 2, but which can be extrapolated to a larger number of access 1 and personal 2 devices:

a.7) sending by the first access device 1a signal to the first personal device 2 using the technology and the protocol with which said communication has been set up in step a.3), containing an invitation to the user of the first personal device 2 to receive said application, or program, whether it is in response to a petition sent by said user by means of his/her respective first personal device 2 or automatically, and b) automatically sending to the first personal device 2 of said user, if the latter has accepted said invitation, using the same technology and protocol used in step a.7), at least said application adapted to the characteristics or type of detected personal device 2, at least in relation to the brand and model, or at least a percentage of probabilities, found out in said step a.6), said adapted application including functionalities which the type of detected personal device 2 is capable of managing, and c) recording and installing at least part of said application, or program, in a memory of the first personal device 2 automatically or after confirmation from the user, In other words, the finding out in a.6) of the brand and model of, for example, a detected mobile telephone 2, has the primary purpose of adapting the application sent in step b) to the same, taking into account for example the size of the display of the mobile telephone 2, the operative system it uses, the Java version it has available, the processing and/or memory capacity it has, etc., thus preventing sending applications requiring capacities that the personal device 2 does not have, such as the case of some of the mentioned prior art documents in which communication is not individualized.

For one embodiment, the method comprises, prior to said sending of said adapted application of said step b), selecting said application adapted to the type of detected personal device 2 from a plurality of applications adapted for different types of personal devices 2, said invitation of said step a.7) making reference to said selected application already adapted to the type of detected personal device 2.

For another alternative embodiment, instead of said selection, the method comprises adapting said application to the detected personal device 2 by means of the manipulation of a generic application, said invitation of said step a.7) making reference to said generic application to be adapted before being sent in said step b).

Once said user has an application adapted to his/her respective personal device 2 installed therein, the method comprises said user running said application installed in his/her respective personal device 2, said run causing a data exchange between his/her personal device 2 and the access device 1 which it is communicated with, for complementing said finding out of said step a.6) by means of the analysis of at least part of said data exchanged upon running said application, i.e. if the brand and model corresponding to the personal device 2 has not been found out 100%, and therefore the application which has been sent thereto is not adapted 100% to its characteristics, the mere fact that the user runs said application, if such application involves the mentioned data exchange, may aid in complementing the finding out of step a.6), because this data may include hints as to the model and brand of the personal device 2, and therefore enable a subsequent sending of an application that is better adapted to the personal device 2.

FIG. 9 shows an embodiment of the proposed method in the form of a flow chart with a series of specific steps indicated as E1 to E27, including the previously described steps as well as some additional step specific of the embodiment which is shown.

Steps E1 to E27 are clustered in three columns according to the device carrying out such steps and in reading from left to right: a mobile telephone 2, an access device 1 and an ASP 3. The steps are the following:

[E1] Initial wait prior to the start of the pollings of step a.1), given that for the present embodiment these pollings are not carried out continuously but at certain intervals.

[E2] Polling (i.e. step a.1) for finding all the personal devices 2 located in the action radius of all the short-range radio technologies supported by the access device 1. Each of said pollings can be broken down into;

[E2.*a*] Sending of a polling message (broadcast) by the access device 1, the content of said polling message being a type of question such as "can you communicate with this specific technology and this specific protocol?".

[E2.*b*] Reception of the polling message by the mobile device 2. [E3] Response of the polling carried out in [E2]. Each response is received by means of a different technology, as has been explained in step a.2). Said response to the polling is divided in.

[E3.*a*] Sending of an acknowledgement message from the mobile device 2 to access device 1, said acknowledgement message being the radio-frequency signal automatically emitted as a response to the polling in step a.2), in this case simply a positive response to the previous question sent in E2.*a* if the mobile device 2 has "understood" it, i.e. if it can communicate with said technology and protocol used in E2.*a*.

[E3.*b*] Reception of the acknowledgement message by the access device 1, including the aforementioned identifier of the mobile device 2,

[E4] Carrying out the alternative shown in the form of the following question: Does the detected mobile device 2 accept receiving binary files by means of the short-range radio technology through which it has responded?, i.e. carrying out step a.4) of the proposed method.

[E5] Step carried out in the event of an affirmative response to E4, and comprising carrying out the alternative shown in the form of the following question: Does the mobile device 2 have the latest version of the application adapted to said terminal?, i.e. previously described step a.5) of the proposed method.

[E6] Step carried out in the event of a negative response to E5, consisting of carrying out a petition for the public data regarding the short-range radio technology of the mobile device 2 through which it has responded to the polling initiated in E2, i.e. the beginning of step a.6), by means of the following sub-steps:

[E6.*a*] Sending the petition for obtaining the public data from the access device 1 to the mobile device 2.

[E6.*b*] Reception of the petition for the public data by the mobile device 2. [E7] Continuing with a.6), the public data requested in E6 is received in this step after a corresponding sending from the mobile device 2 by means of the following sub-steps:

[E7.*a*] Sending of the public data from the mobile device 2.

[E7.*b*] Reception of the public data by the access device 1.

[E8] Process for calculating a vector from the data obtained in E7, i.e. the univocal indicator obtained when running an identification algorithm in step a.6).

[E9] Searching process for the vector obtained in E8 with a reference vector table that can be accessed by the access device 1 (the mentioned reference data structure).

[E10] Carrying out the alternative shown in the form of the following question: Does the vector obtained in E8 match any of the vectors in the table of E9?

[E11] Step carried out in the event of a negative response to the question asked in the previous step and consisting of carrying out a heuristic process for determining the brand and model from the public data obtained in E7.

[E12] Carrying out the alternative shown in the form of the following question: Has an approximate model of the detected mobile device 2 been able to be obtained from process E11?

[E13] Step carried out in the event of an affirmative response to the question asked in E12 and consisting of generating a brand and model hypothesis for the mobile device 2.

[E14] Step carried out in the event of a negative response to the question asked in E12 and consisting of generating a generic model hypothesis for the mobile device 2.

[E15] Step carried out in the event of an affirmative response to the question asked in E10 and consisting of obtaining the brand and model from the vector obtained in E8, due to the fact that a match has been found in said table in relation to the consulted vector.

[E16] Step to be carried out after having found out the model and brand of the mobile device 2 insofar as it has been possible, or after one of the two mentioned hypotheses has been made, and consisting of obtaining the data associated to the assumed mobile device 2 model (size of display, operative system, Java version, etc.) as said data can be accessed by the access device 1 for each mobile device 2 model and brand recorded in said table or in other data structures.

[E17] Choosing the application that is best adapted to the mobile device 2 model and brand deduced in E15, or by default adapted to the model and brand hypothesis of E13 or generic model hypothesis of E14.

[E18] Sending an invitation to the mobile device 2 so that the end user gives his/her approval to download the application chosen in E17, i.e. step a.7) of the proposed method.

[E19] Carrying out the alternative shown in the form of the following question: Does the user accept the invitation sent in E18?

[E20] Step carried out in the event of an affirmative response to the question asked in E19, and consisting of downloading the application adapted to the mobile device 2 from the access device 1 with its subsequent installation, i.e. steps b) and c) of the proposed method.

[E21] Step carried out in the event of a negative response to E4, an affirmative response to E5 or a negative response to E19, and consisting of discarding the interaction with the mobile device 2.

[E22] Obtaining the data resulting from the processes E8 (vectors), E13 (brand and model hypothesis) and E14 (generic model hypothesis) by ASP 3.

[E23] Obtaining data (vectors, hypotheses, public data, etc.) manually or by means of other sources, such as those relating to the mentioned "training", from mobile devices 2 of a known type.

[E24] Learning process from the data obtained in E22 and E23 for the purpose of organizing and relating the received data, calculating new vectors or hypotheses.

[E25] Assigning brands and models with their respective vectors.

[E26] Creating new brand, model and vector tables, and/or updating previous tables.

[E27] Step relating to the management of said brand, model and vector tables, such management specifically comprising;

[E27.*a*] Generating a master table in the ASP.

[E27.*b*] Copying the table in the access device 1.

For another more basic embodiment, said short-range radio communication is a wireless communication in a local area and by means of the use of an arrangement such as that shown in FIG. 1, though is not limited to it, the method comprises:

a) sending from said first access device 1 located in a first specific place and suitable for communicating bidirectionally, a signal to said first personal device 2 containing an invitation to the user of said first personal device 2 to receive an application, or program, whether in response to a petition sent by said user by means of his/her respective first personal device 2 or automatically, b) sending said application, or program, to said first personal device 2 of said user if the latter has accepted the invitation, and c) recording and installing at least part of said application, or program, in a memory of the first personal device 2 automatically or after confirmation from the user.

Said steps a) (including steps a.1) to a.7)), b) and c) are carried out when a user enters a premises or establishment for the first time in which said first access device 1 is arranged, being said installed application specific of said premises, as described in the explanation of the invention.

Optionally said step b) further comprises sending multimedia information and/or one or more sub-applications to the first personal device 2 of said user, said application, or program, being suitable for managing said multimedia information and said sub-application or sub-applications for the purpose of supplying said and/or other multimedia information to the user of the first personal device 2.

Once the user has installed the application of the establishment or area in which he/she has entered for the first time, i.e. after said step c), the method comprises:

d) said user running said application installed in his/her respective first personal device 2, said run causing:

d1) managing multimedia information located in the first personal device 2 and/or one or more multimedia sub-applications located in the first personal device 2 for the purpose of supplying said and/or other multimedia information to the user of the first personal device 2.

Said step d1) can be carried out even when the user has left the establishment, because it is carried out autonomously, with only the data that the user has loaded in his/her personal device 2. The possibility of interaction would obviously not exist if the user does not enter the coverage area of the access device, in this case the first access device 1, again.

To enable said interaction or simply if the user or the application wants or needs, respectively, to send information to or receive information from the first access device 1, running said application further causes, during, prior to or after said step d1):

d2) setting up at least one temporary communication between the first personal device 2 and the first access device 1, and d3) interactively managing multimedia information and/or one or more multimedia sub-applications available in the first personal device 2 and/or in the first access device 1 for the purpose of supplying said and/or other multimedia information to the user of the first personal device 2 and enabling participation of said user.

In other words, by means of running the application the user can enjoy an interactive multimedia experience with a constant or intermittent bidirectional data flow depending on the application.

It is possible that the first personal device 2 only has the aforementioned application loaded therein and does not have multimedia information or sub-applications necessary for using said application. In such case at least part of the multimedia information and/or the multimedia sub-applications are located only in the first access device 1, therefore they need to be sent to the first personal device 2. Therefore, the method comprises a step, prior to said step d3), for sending said multimedia information and/or multimedia sub-applications located in the first access device 1 from the latter to the first personal device 2 for the purpose of enabling the aforementioned management of step d3).

There are two preferred situations for handling said sending once it is received by the first personal device 2, depending on the application that is being run.

One of them consists of carrying out the management of said step d3), i.e. of the information and/or sub-applications located in the first access device 1 and sent to the first personal device 2, after the recording thereof, at least in part, in a volatile or non-volatile memory of the first personal device 2. In the event that they are recorded in a non-volatile memory, they will be available for the user when he/she leaves the coverage area of the first access device 1.

Another possibility contemplates carrying out the management of step d3), i.e. of the information and/or sub-applications located in the first access device 1 and sent to the first personal device 2 immediately and sequentially upon reception thereof, without needing a prior recording step. This is the case, for example, of sending audio or video frames which are immediately reproduced upon reception but not recorded. Obviously, once the user is outside the premises, he/she will no longer be able to use said reproduction.

Once all the information and/or sub-applications located in the first access device 1, or all of that desired by the user, has been sent to the first personal device 2, the method comprises automatically terminating said communication set up in said step d2), at least temporarily, the command arriving from the first personal device 2, due to running the application, or program, or from the first access device 1.

This allows optimizing the use of the battery (when this is the case) of the personal device 2, because wireless communication, which generally involves a rather considerable consumption for a device of such type, is activated and deactivated automatically and is maintained only when needed.

For the purpose of further customizing the information to be received, the method comprises sending from the first personal device 2 a preference profile of the respective user, said profile reflecting said information desired by the user and said preference profile being able to be accessed by said first access device 1, either because it remains recorded therein or in other devices or apparatuses that can be accessed by it.

The mentioned sub-applications can be programs depending on the installed application, i.e. a type of sub-programs, in which case said management of the sub-applications comprises running at least one of them automatically, by means of the intervention of the user or in part automatically and in part by means of the intervention of the user. Automatically is generally understood by meaning that the application itself will run the sub-applications it decides, when needed, in a manner that is transparent to the user.

For another embodiment, it is contemplated that the user, in order to said management of said sub-applications being carried out, can select and run those which he/she desires by means of supplying to him/her indicators associated to said sub-applications, such as icons if said supplying consists of the display thereof in display means of his/her respective, i.e. first, personal device 2, such as, for example, in a display 12 of a mobile telephone.

Once the user has said application, said sub-applications and/or said multimedia information previously sent from the first access device 1 installed and/or recorded in the aforementioned memory/memories of the first personal device 2, the method comprises:

comparing them with the application, sub-applications and/or multimedia information, respectively, located in the first access device 1, and updating them if the latter are newer and different at least in part automatically or after confirmation and/or selection by the user, or substituting them.

This will occur when the user enters a premises again where he/she had already been and where he/she had downloaded its respective application. The access device 1 of said premises (following with the name of this description, first access device 1) will update the application and/or the contents if the latter has new application versions and/or contents. For another embodiment the update is also in accordance with a preference profile of the user previously sent in his/her first visit to the premises or when the update is carried out, such update being carried out in a more customized manner.

The method also comprises automatically detecting the user by means of the identification of his/her respective personal device 2, in this case the first personal device 2, through, for example, reading an identifier thereof. This can be done both the first time the user enters an establishment and on subsequent occasions.

For yet another embodiment, the method comprises in addition to detecting a personal device 2, acquiring an identification thereof by means of an access device 1, automatically or after the action of the user, which action such as that consisting of running an application installed in his/her respective personal device 2, and additionally associating said identification with his/her respective preference profile, for the purpose of improving the previously mentioned customization of the contents to be sent to each user.

The personal devices 2 generally have, in some cases and depending on the wireless technology by means of which they can communicate, a type of registration or specific identifier of each personal device which can be detected by an access device 1 according to the proposed method. This is the case, for example, with Bluetooth® technology.

Nevertheless, for other wireless technologies, which can also be used according to the proposed method, there is no such identifier, therefore the detection and/or picking up of an identification thereof may be different and may be of the type that a person skilled in the art considers appropriate.

For one embodiment, said detection is carried out prior to mentioned step a), and prior to the mentioned update, the aforementioned invitation therefore being automatically sent to the user when he/she enters the local coverage area of an access device 1 when his/her respective personal device 2 is detected, and its contents being updated upon being detected when entering the same local area on a subsequent occasion.

The method proposed by the first aspect of the present invention comprises carrying out all the steps for a single first personal device 2 and a plurality of access devices equivalent to the first access device 1 one by one and separately in a manner similar to that carried out with the first access device 1, each of said access devices 1 located in a specific place and with applications, sub-applications and multimedia information of their own and different, at least in part, from one another, the method being applicable between the first personal device 2 and the access device 1 within the local coverage range of which the first personal device 2 is located.

In other words, everything related to the actions to be carried out when the user enters the coverage area of the first access device 1 for the first time or in subsequent visits is also applicable to other areas of other access devices 1, a wide variety of applications, sub-applications and multimedia information of many types and specific of each access device 1 being able to be installed and being able to update them in subsequent visits.

For an embodiment in which several of said access devices 1 are far enough away from one another such that their respective local coverage ranges do not overlap, and form a group because they share at least their respective applications, the method comprises carrying out the steps subsequent to steps a) to c) between the first personal device 2 and any of the components of said group regardless of which of the access devices 1 of those belonging to said group has taken part in steps a) to c).

This is the case of two access devices belonging for example to two franchises of the same business chain, the main applications or programs of which are common but they have their own sub-applications and/or multimedia information that are different from one another. When a user enters in any of said two franchises for the first time, he/she can install said main common application without needing to re-install it when he/she enters in the other franchise of the same business chain, no even though the latter franchise is geographically far from the first franchise.

Another case contemplated by the proposed method is that which usually occurs due to a deficient assembly or setting of two access devices 1 for which two local coverage ranges of said two respective access devices 1 overlap. When a user simultaneously enters both coverage ranges, the method comprises the user being able to chose, through his/her corresponding personal device 2, which access device 1 he/she will set up communication with.

Obviously, and as previously mentioned, the explanation of all the previous steps has been done for the sake of clarity for a single personal device 2 referred to as first personal device 2 of a single user, but they can be fully extrapolated for a plurality of personal devices equivalent to the first personal device 2 one by one and separately in a manner similar to the one carried out with the first personal device 2. In other words, a multitude of users can enter a plurality of local areas with their respective personal devices 2 (mobile telephones, electronic agendas, etc.), each of such areas being covered by a respective access device 1, and a multitude of applications, sub-applications and multimedia information can be installed and updated as has been explained for the first personal device 2.

The method also comprises carrying out all the steps between an access device 1 and several personal devices 2 in parallel, the individual wireless communication paths between each personal device 2 and said access device 1 being able to be with several different technologies and/or protocols.

For another embodiment, the method comprises adjusting the coverage range of one or more of said individual communication paths from the access device 1 itself or remotely, as will be explained below.

The proposed method also contemplates the application of all the steps in arrangements or configurations including interconnections of an access device 1 with another external device or apparatus, not only for the aforementioned exchange of univocal indicators, public data, hypotheses, tables, etc., relating to finding out step a.6), but also for carrying out the remaining described steps in part or in their entirety.

For one of said arrangements, the method comprises controlling, managing and supplying applications, sub-applications and multimedia information to at least one of said access devices 1 acting as a slave is or as an antenna by means of another of said access devices 1 acting as a master 1*m* (such as, for example, for the arrangement of FIG. 2, in which two slave access devices is take part), or by means of a services provider server 3 (such as, for example, for the arrangement of FIG. 3, in which two slave access devices is take part), in the last case of which the communication through the section linking said access device slave is with said server 3 can be carried out through at least one type of communication network or a communication path that is different from the one linking the personal device 2 with the master access device 1*m*, whether it is wired or wireless, of a local, middle or extensive area.

The frequent renewal and/or update of the contents of the access devices 1 is also contemplated to thus be able to update the contents of the personal devices 2 entering their coverage radius.

Figure 2:
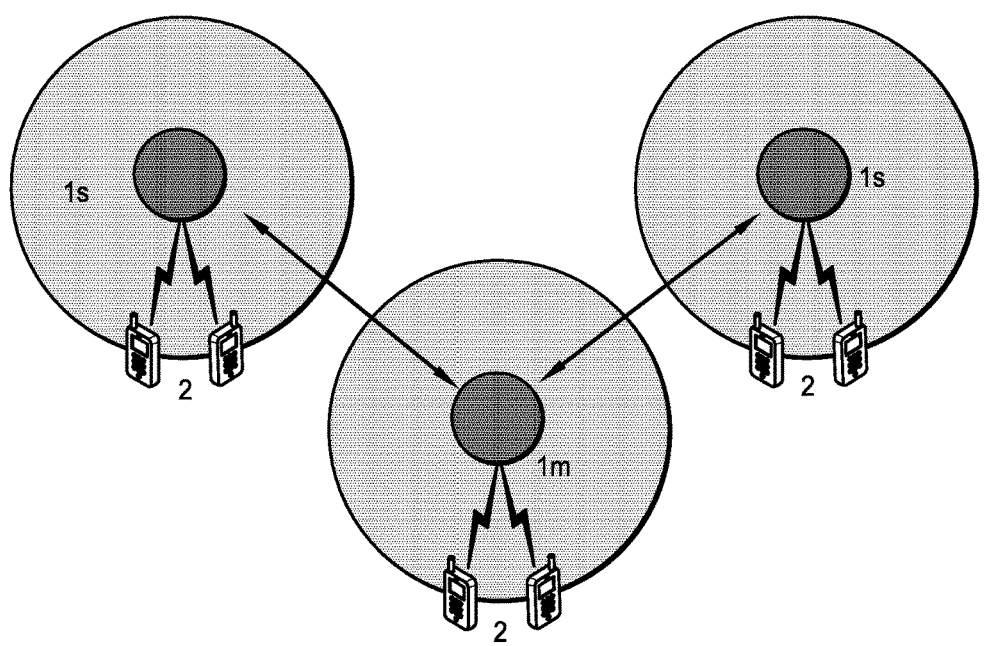
FIG. 2 shows a schematic representation of another arrangement of the system and method proposed by the present invention, according to another embodiment, in which an access device acts as a master with respect to other slave access devices.
Figure 3:
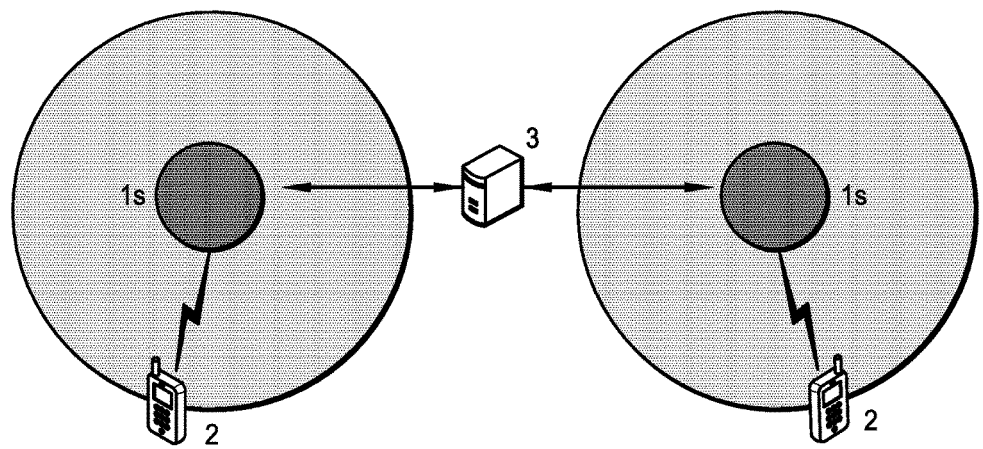
FIG. 3 shows a schematic representation of another arrangement of the system and method proposed by the present invention, according to another embodiment, in which a computer or server acts as a master in relation to slave access devices.

To that end, the proposed method comprises when said slave access device or devices is have applications, sub-applications and/or multimedia information recorded therein, updating them at least in part, automatically, or substituting them at certain intervals from said master access device 1*m* (see FIG. 2) or from said services provider server 3 (see FIG. 3).

Figure 4:
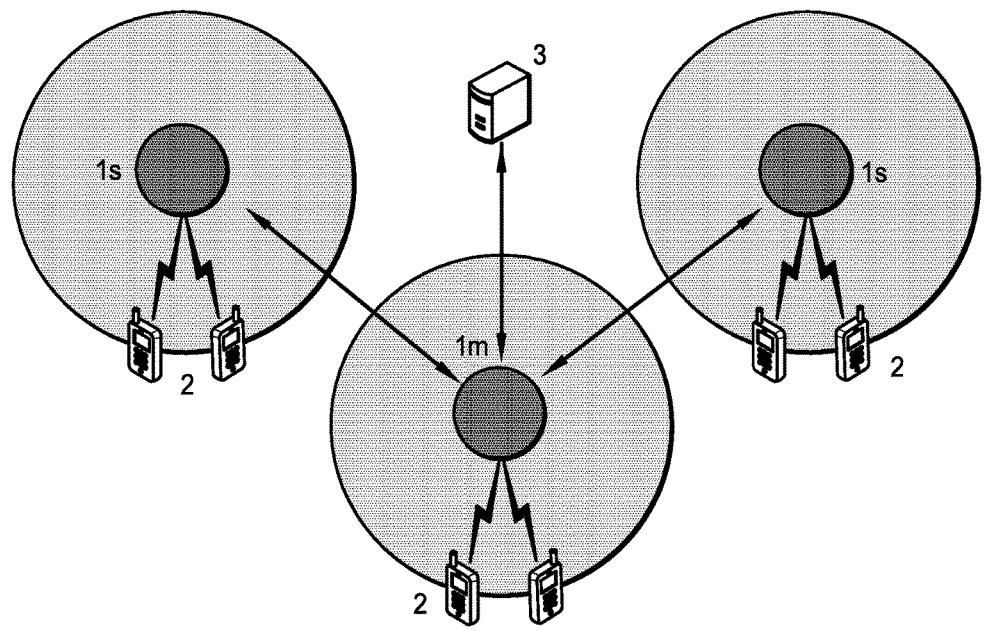
FIG. 4 shows a schematic representation of another arrangement of the system and the method proposed by the present invention, according to another embodiment, in which a computer or server has been added to the arrangement of FIG. 2, acting as a master with respect to the master device of FIG. 2.

For other arrangement, such as the one shown in FIG. 4, similar to that of FIG. 2, but with the addition that the master access device 1*m* is in turn controlled by a computer or services server 3, the method comprises, when said master access device 1*m* (or several of such devices for other embodiments) have applications, sub-applications and/or multimedia information recorded therein, updating them at least in part automatically or substituting them at certain intervals from said services provider server 3.

The aforementioned setting of the coverage ranges of the different individual communication paths which a single access device 1 can maintain can be carried out, according to the proposed method, for a series of individual communication paths, similar to said individual communication paths, of a plurality of slave access devices 1*s*, from said master access device 1*m* (FIG. 2) or from said services provider server 3 (FIG. 3).

Both the operations to be carried out by said master access device 1*m* and by said services provider server 3 (management, control, updates, etc.) are the consequence of a run step for running a computer program installed in the master access device 1*m* and/or in the services provider server 3.

The mentioned supply of multimedia information and/or of indicators associated to sub-applications or applications is carried out for a preferred embodiment by means of the respective display thereof in display means comprised in the first or in any of the personal devices 2, such as a display of a mobile telephone.

In such case, the aforementioned update step involves the dynamic update of the graphic environment shown in said display in relation to the multimedia information and/or said indicators supplied (in this case icons or equivalent), forming part of the CADACA adaptation explained in the previous section of the present specification.

For another embodiment, the method comprises bidirectionally communicating at least two users with two respective personal devices 2 through at least one of said access devices 1, enabling communication between said two users always through at least one access device 1.

Figure 5:
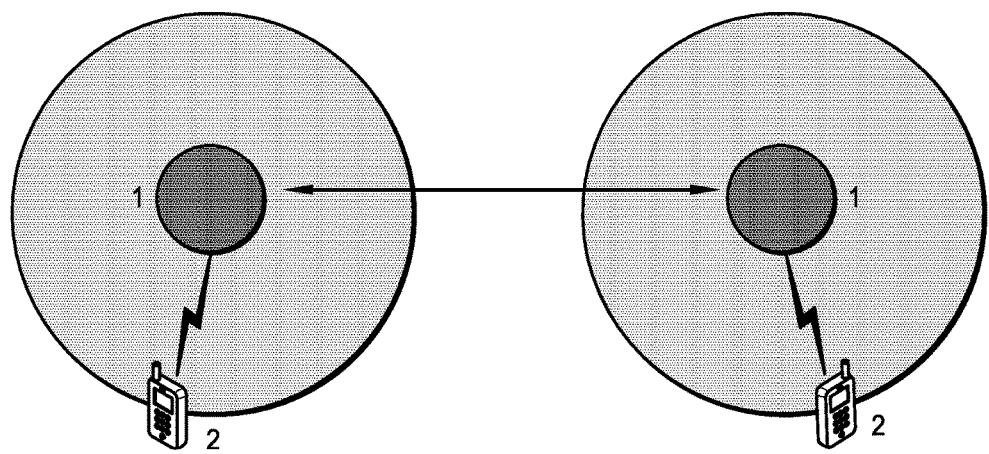
FIG. 5 shows, by means of a schematic representation, yet another arrangement for another embodiment of the system and method proposed by the present invention, in which two access devices are interconnected.

In the event that said communication of at least two users is done through two access devices 1, the method comprises bidirectionally communicating said two users with two respective personal devices 2 through said access devices 1, each of said personal devices 2 being within the respective local coverage range of one of said access devices 1, said local coverage ranges not overlapping and said access devices 1 being communicated by at least one type of communication network or a communication path different from the ones linking each personal device 2 with a respective access device 1. In other words, two users geographically located at points that are very far away from one another can communicate through two respective wireless areas of a local area, the respective access devices 1 of which are interconnected through an extensive but transparent communication for the users, without the users needing to set up an additional communication with their respective personal devices 2 being of a greater range. This situation is shown in FIG. 5.

For the purpose of preventing other users from bothering a user without his/her permission by means of, for example, sending massive unwanted information (spam), the method comprises, when one of said personal devices 2 is communicating with one of said access devices 1 or when it is running one of said applications or programs, blocking wireless direct access to said personal device 2 for another device through the communication protocol used for said communication with said access device 1, being able to be accessed the personal device 2 only through said access device 1 in a limited manner.

This blocking does not refer to other communications to be set up by means of other protocols which are not those that are established between the personal devices 2 and the access devices 1. In other words, if, for example, the personal device 2 is a mobile telephone which is communicating with an access device 1 through Bluetooth® technology, it will not be possible to access such telephone using such technology, but it will be possible with another technology, for example to receive a telephone call through a GSM mobile telephony network.

The applications, sub-applications and multimedia information generically referred to so as to explain the proposed method according to the first aspect of the present invention can be of a very diverse nature, depending, among others, on the type of personal device 2 to be used, especially on the functionalities it incorporates.

Preferred examples are the following:

An embodiment for which the application is a video player program, in which case the multimedia information is a video frame to be directly played when running the application either because it is recorded in the personal device 2 or because it is sent from an access device 1 in blocks which are previously recorded in the personal device 2, or continuously and sequentially, being played in this latter case directly without any prior recording. Such video frames can be from advertising videos for a product if the establishment in which the access device 1 is arranged is a business, or a promotional video for a movie if, for example, the establishment is a movie theater.

A similar embodiment, but one which enables the intervention of the user when selecting the video frame to be displayed, includes in addition to the mentioned video player program, a sub-application in the form of a program which configures video channels and corresponding video frames which are different for each of said canales. In this case, the user can choose one of said channels by means of running said channel configuring program which can be automatically initiated when running the playing program or specifically run by the user, after selection thereof, for example, when navigating through a visual menu that incorporates said configuring program and visually displays it by means of an icon or the like on the display of the personal device 2. It is also possible that said channel is selected automatically according to several parameters.

Another embodiment also applied to the wireless transmission of video signals is one for which said video channels of the previous embodiment are interactive television channels, the selection of which by the user or the automatic selection by the access device 1 allows in addition to receiving by the personal device 2 the video frame associated to the selected channel, exchanging additional information between the personal device 2 and the access device 1 in relation, for example, to: surveys, votes, contests, etc.

For other embodiments, unlike the previous embodiments relating to video transmission, it is not necessary for the personal device 2 to have display means (although they are also applicable for those personal devices 2 which do have them).

This is the case of audio reproduction, which can also include different levels of functionality, in a manner similar to the applications relating to video.

A basic case is the one in which the application is an audio player or capturer/player program and the multimedia information is audio, and the latter is played directly in the personal device 2 or sent previously from an access device 1, without the possibility of interaction by the user.

A more complex embodiment consists of also using an audio player or capturer/player program in addition to a sub-application in the form of a program for configuring audio and multimedia information channels in the form of audio portions belonging to each of said channels, which is chosen by the user by means of running said configuring program or is selected automatically.

Another embodiment is one in which the application is a voice communication program, the sub-application is an audio player or capturer/player program and the multimedia information is audio, the method comprising running the application and the sub-application to thus set up telephone communication through a mobile, land or internet network, depending on the extensive networks to which the access device 1 is connected. For the user the type of network that the access device 1 uses for setting up the telephone communication is indifferent, because it will simply use the wireless connection of the local area with the access device 1 to achieve communicating by telephone, i.e. the owner of the establishment in where the access device 1 is arranged will decide whether or not to charge the customer for the use of said external networks.

For another embodiment, the application is a program for carrying out bank transactions and the multimedia information is information related to bank transactions. In this case, the transaction can be carried out between the personal device 2 and the access device 1 (or an entity connected to the same local or remotely) by means of the exchange and management of multimedia information or of information different from the multimedia information but also related to bank transactions.

A further embodiment of the proposed method consists of using said wireless connection to play on-line with another user. To that end, the application installed in the personal device 2 is a program or game for playing on-line and the multimedia information comprises at least graphics and positional data of at least some of said graphics (such as characters which are moving or change position).

As has been described in the explanation of the invention, the proposed method comprises for the embodiments included in said second line of utilities using an actor personal device 101 as a central device 101 which is used by a user and, and using target devices 102 as surrounding devices 102 which are susceptible to being accessed by said actor portable device 101 by means of said individualized communication set up in step a.3) for their remote use by said user.

FIG. 9 shows an arrangement in which said actor personal device is a mobile telephone 101 surrounded by a series of target devices 102 which in FIG. 9 are: other personal devices 102, a printer 102 and an access device 102.

As has been previously described for the embodiments of the second line of utilities, the proposed method comprises detecting several target devices 102 and selecting which is used to set up communication (and setting it up) according to a previously explained series of criteria.

For one embodiment, when the user of the actor mobile telephone 101 runs a program, such as a game with which he/she wishes to play on-line with another user or other users, said run causes automatically carrying out the steps of the proposed method for detecting and identifying as many target portable devices 102 using the technology and the protocol that the data flow involving the use of said game requires, and if only one exists, selecting the one having it and setting up communication with it. In the event that there are two or more target personal devices 102 suitable for communicating with said technology and protocol by means of the application of the proposed method it would be possible to select and communicate with the two (or more) target personal devices 102 by means of respective individualized communication paths, or to select one of them according to any of the other criteria explained (occupation, availability, etc.), or manually by the user.

If different target devices 102 respond to the polling, such as in addition to the mentioned portable devices 102, for example a printer 102, by means of the application of the proposed method, the actor personal device 101 takes into account the identifier acquired during step a.2), or another type of identifier acquired in said step a.2) or at another time, to know what type of target device 102 has responded, discarding communication with the ones that are not suitable for the action desired by the user of the actor personal device 101, i.e. for the previous example in relation to an on-line game, even though the printer 102 has responded to the polling, communication with the latter is discarded as it is not a device suitable for carrying out the aforementioned on-line game; if in contrast the desired action were to print, the discarded target devices 102 would be the portable devices 102 and communication would be set up with the printer 102.

It is thus intended that a user of one of these actor mobile telephones 101 with the capacity to communicate with multiple technologies and protocols is not asked which technology and protocol to communicate with at all times, but rather said process is carried out automatically according to the proposed method.

In a second aspect, the present invention also relates to a system of individualized short-range radio communication applicable to communications that may include applications or programs and multimedia information.

According to a third aspect of the invention, a central device suitable for being incorporated in the proposed system according to the second aspect is also intended.

By means of both, the central device and the system proposed according to said third and second aspects, respectively, it is possible to carry out the method proposed by the first aspect of the invention, although the manner of using both the central device and the system is not limited to the proposed method.

Figure 6:
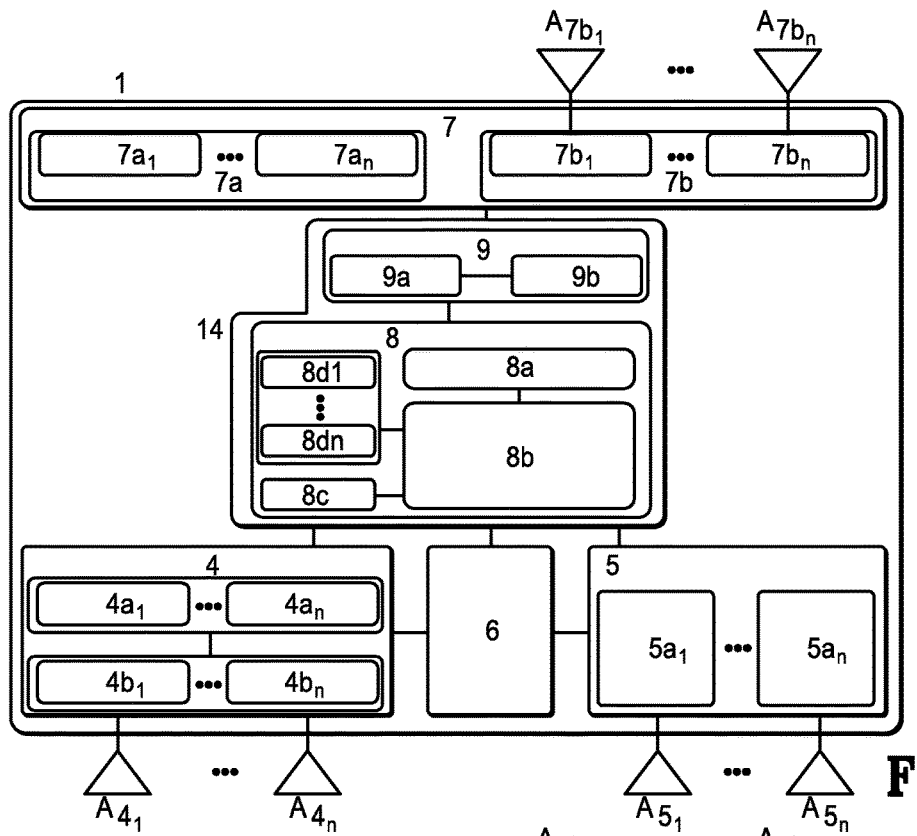
FIG. 6 shows a modular representation of the inside of an access device according to the third aspect of the present invention, for one embodiment.
Figure 7:
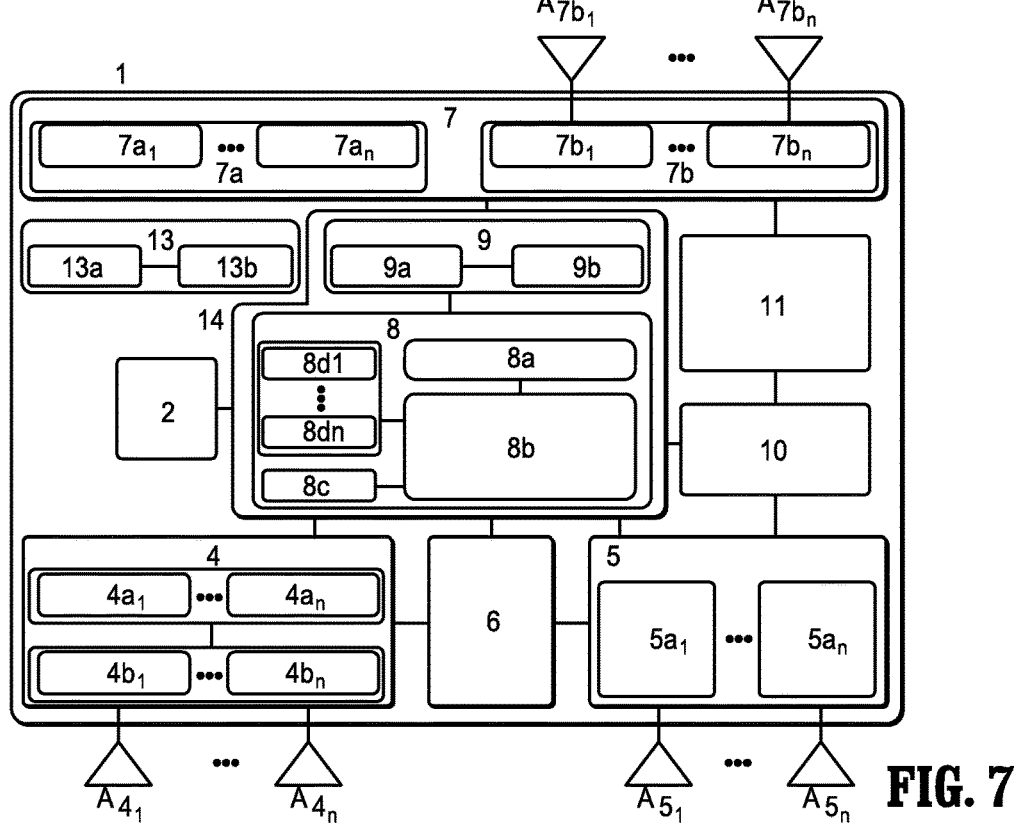
FIG. 7 shows another modular representation of the components forming an access device with more functionalities than the one shown in FIG. 6, for another embodiment, FIG. 8 schematically shows the integration of several access devices according to the third aspect of the invention, in a system such as the system proposed according to the second aspect of the invention.
Figure 10:
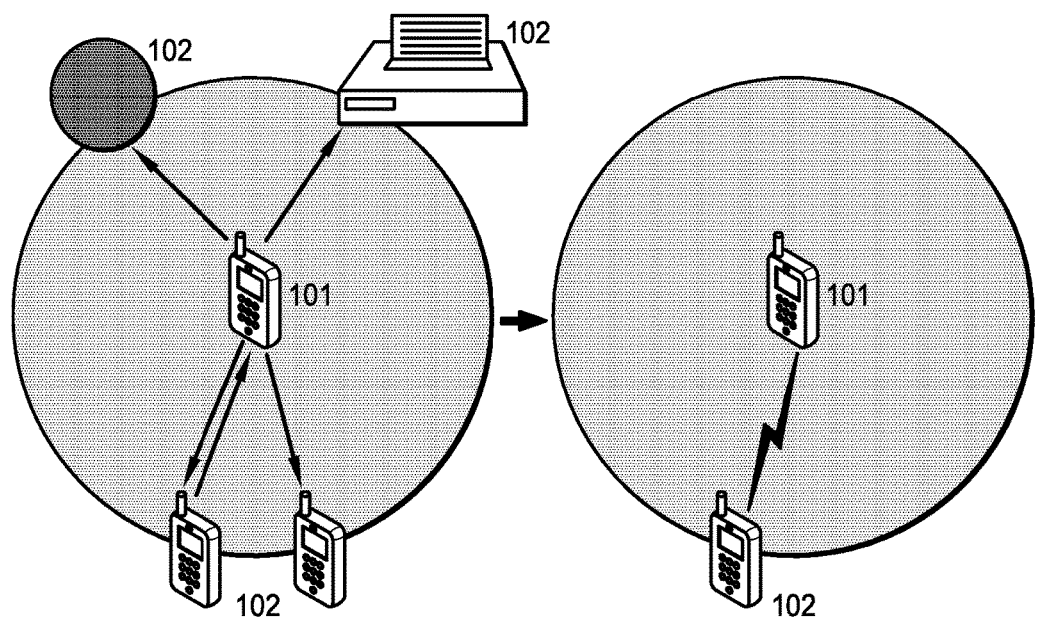
FIG. 10 shows a schematic representation of a basic arrangement of the central device proposed by the third aspect of the present invention, for an embodiment in which the central device is an actor personal device, surrounded by several surrounding target devices to communicate with according to the method proposed by the first aspect of the invention.
Figure 11:
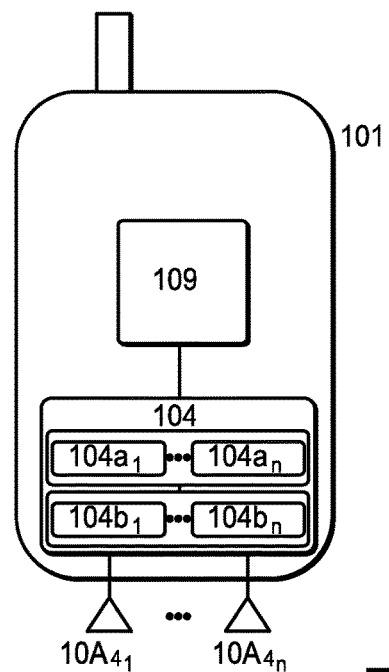
FIG. 11 shows a basic modular representation of the inside of an actor personal device according to the third aspect of the present invention, for one embodiment.

As can be schematically seen in FIGS. 1 and 10, the system comprises for two embodiments, each one representative of one of the two mentioned lines of utilities:

surrounding devices 2, 102, each of them with at least one communication module suitable for bidirectionally communicating by means of at least one short-range technology and at least one protocol, at least one of said surrounding devices 2, 102 being able to use a short-range technology and/or protocol different from those used by another of said surrounding devices 2, 102 for carrying out said bidirectional communication, i.e. there being able to be surrounding devices 2, 102 using different technologies and/or protocols, although for an embodiment all the surrounding devices 2, 102 use the same technology and the same protocol, and a first central device 1, 101 such as the one proposed according to the third aspect of the present invention, suitable for detecting radio-frequency signals of multiple technologies and protocols, and for setting up bidirectional short-range radio communications using said technologies and protocols, comprising an electronic system comprising, as can be seen in FIGS. 6 and 7 for the first line of utilities, and in FIG. 11 for the second line of utilities, at least:

a first communication module 4, 104 with:

a series of first communication sub-modules $4a_1 \ldots 4a_n$, $104a_1 \ldots 104a_n$, each of them dedicated to automatically polling the environment of the first central device 1, 101 by means of each of said multiple technologies and protocols for automatically detecting possible radio-frequency signals coming from said communication modules of said surrounding devices 2, 102, and for automatically acquiring identifier data in the form of at least one unique identifier, or identifier registration, of each surrounding device 2, 102, included in said radio-frequency signals, a series of second communication sub-modules $4b_1 \ldots 4b_n$, $104b_1 \ldots 104b_n$, associated to said first communication sub-modules $4a_1 \ldots 4a_n$, $104a_1 \ldots 104a_n$ intended for automatically setting up individualized communication with each detected surrounding device 2, 102 using the same technology and the same protocol with which each one has emitted one of said radio-frequency signals as a response to said polling, and a control module 9, 109 with at least one analysis and processing unit adapted for controlling at least said first communication module 4, 104 of the first central device 1, 101.

For an alternative embodiment, said first communication sub-modules $4a_1 \ldots 4a_n$, $104a_1 \ldots 104a_n$ and said second communication sub-modules $4b_1 \ldots 4b_n$, $104b_1 \ldots 104b_n$ form a single communication sub-module intended for carrying out the functions of both, the first $4a_1 \ldots 4a_n$, $104a_1 \ldots 104a_n$ and the second $4b_1 \ldots 4b_n$, $104b_1 \ldots 104b_n$ sub-modules, in an alternating manner, first being dedicated to the aforementioned automatic polling and then to the mentioned setting up of individualized communication, and so on and so forth, although obviously in the previous case in which each sub-module carries out a mission in a dedicated manner is most preferred.

Therefore, by means of said first communication module 4, 104 controlled by the aforementioned control module 9, 109, it is possible to carry out steps a.1) to a.3) according to the method proposed by the first aspect of the present invention.

In relation to the first line of utilities for which the central device is an access device 1 located in a specific place and the surrounding devices are personal devices 2 used by users, FIG. 1 shows two of said personal devices 2 in the form of two mobile telephones 2 on the left of said FIG. 1, the arrows therein pointing to the mobile telephones 2 showing the mentioned polling (for a technology and a protocol), and the arrow pointing towards the access device 1 which comes from one of the personal devices 2 showing the response to said polling, i.e. only the personal device 2 where said arrow starts is suitable for communicating with the technology and the protocol with which said polling has been carried out (although for the sake of clarity, FIG. 1 does not show it, the polling is carried out for multiple technologies and protocols as previously has been described).

On the right side of FIG. 1, the access device 1 communicating (situation indicated by the zigzag arrow therein illustrated) with the personal device 2 which has responded to the polling is shown.

Similarly, in relation to the second line of utilities for which the central device is an actor personal device 101 and the surrounding devices are target devices 102, FIG. 10 shows said actor personal device 101 in the form of a mobile telephone 101 and a series of target devices 102 in the form of two mobile telephones 102, a printer 102 and an access device 102, on the left side of FIG. 10, the arrows depicted therein reflecting the same actions as those of FIG. 1, and therefore said FIG. 10 reflects a situation in which only one of the target mobile telephones 102 responds to the polling.

As in FIG. 1, the right side of FIG. 10 shows the actor mobile telephone 101 communicating (situation indicated by the zigzag arrow therein illustrated) with the target mobile telephone 102 which has responded to the polling.

As of this point of the specification and until otherwise indicated, the system and the device proposed by the second and third aspects of the present invention, respectively, for the mentioned first line of utilities, i.e. for the case in which the central device is an access device 1 and the surrounding devices are personal devices 2, will be described.

In the following description of the proposed system which incorporates one or more access devices 1 according to the embodiment, the access device proposed according to the third aspect of the invention will also be described, from a modular approach, for different embodiments or levels of functionality, referring to said access device proposed by the third aspect when any access device is mentioned when describing the system.

Hereinafter reference will be made to the communication between said first access device 1 and a first personal device 2, and for the sake of clarity in the description said first personal device 2 will be representative of each of the other personal devices 2.

The aforementioned control module 9 of the access device 1 is adapted for automatically finding out if said personal device 2 is adapted for receiving binary data, said finding out generally being carried out according to step a.4) of the proposed method.

The aforementioned first communication module 4 of the first access device 1, or another similar one, is also intended for sending to said first personal device 2, through said communication set up by means of at least said second sub-module $4b_1 \ldots 4b_n$, a signal in the form of an invitation to receive an application, or program, the first personal device 2 having an electronic system with one or more memories for storing one or more applications or programs, in association with a processing unit.

Figure 8:
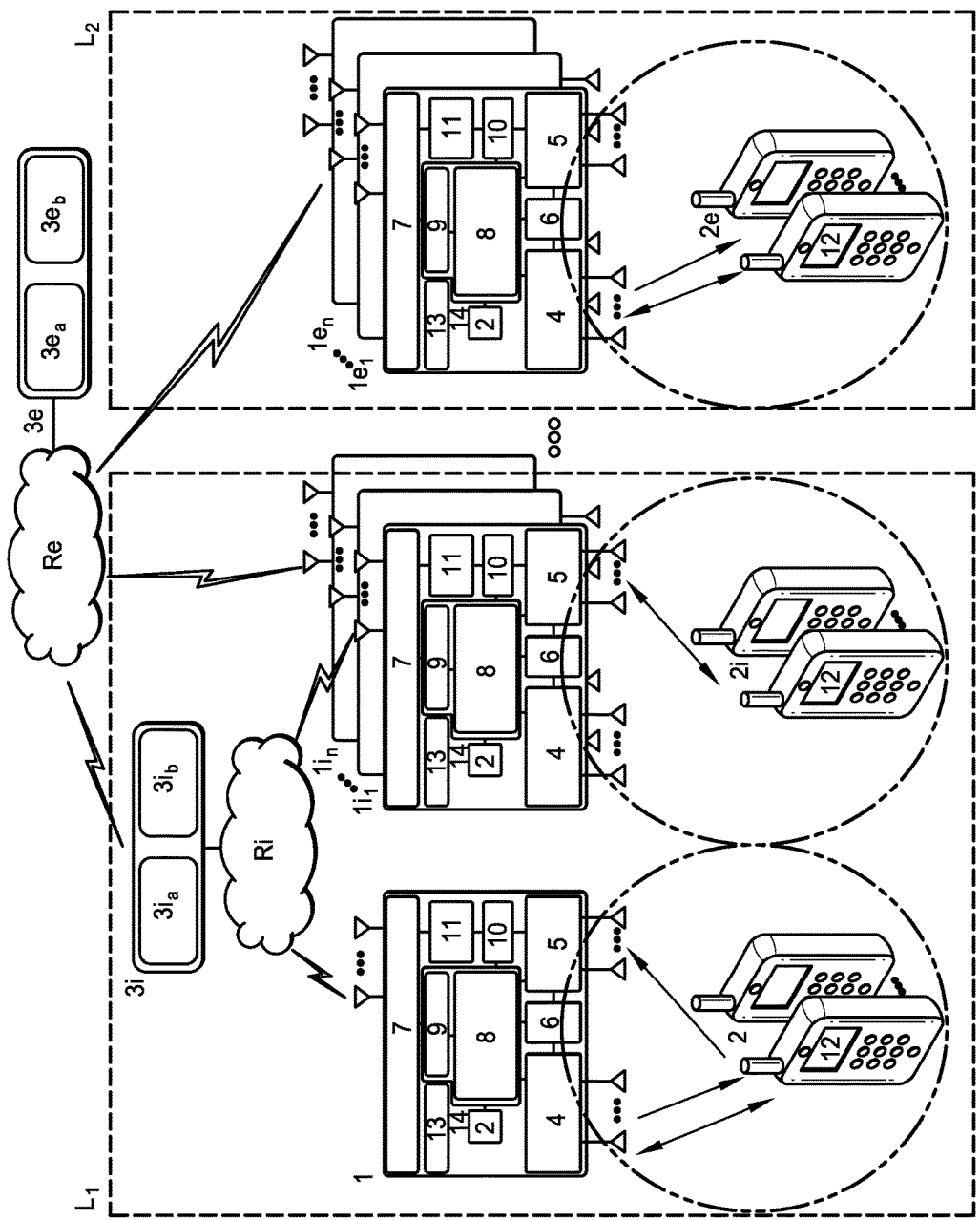

The mentioned electronic system of the first access device 1, as can be seen in FIGS. 6, 7 and 8, also comprises:

a second communication module 5 suitable for bidirectionally communicating with said first personal device 2 if the latter is within its respective short-range radio coverage range, for sending said application, or program, from storage means and receiving signals therefrom in the form of a petition and/or acceptance of being sent said application, and if the device already has an application installed, setting up an interactive communication derived from the functionality of the application, if needed, and a control and storage module 14 comprising at least:

a non-volatile memory 8 comprising said storage means where said application, or program, is recorded and where said identifier data of said first personal device 2 and of other similar ones are recorded if they have been previously acquired, and the aforementioned control module 9 for also controlling said second communication module 5 for the purpose of also setting up individualized communication with the first personal device 2 using said second communication module 5 for sending said application, or program, said control module 9 being adapted for managing said interactive communication derived from the functionality of the application, if needed, according to the analysis and processing of said petition and/or acceptance signals.

The control module 9 comprises or has access to a data structure which relates identifier registrations of several personal devices 2 with a series of information including at least references to at least said application, or program, for one or more versions, to be sent from the first access device 1 to the personal devices 2, the control module 9 being adapted for automatically consulting said data structure in general according to step a.5) of the proposed method.

Said control module 9 is also adapted for controlling said first communication module 4 for carrying out an automatic data exchange with the communication module of the first personal device 2, and for carrying out a corresponding analysis and processing of said data for the purpose of finding out as much as possible the characteristics or type of detected personal device 2, said finding out generally being carried out according to step a.6) of the proposed method, and said first communication module 4 being adapted so that said data exchange is carried out invisibly for the user of the first personal device 2.

Once said finding out of the characteristics or type of detected personal device 2 has been carried out, the control module 9 is adapted for controlling said second communication module 5 for automatically sending to the first personal device 2 said application adapted to the characteristics or type of detected personal device 2, at least in relation to the brand and model, said adapted application including functionalities that the type of detected personal device 2 is capable of managing.

The proposed system comprises a plurality of access devices 1 similar to the first access device 1, each of them located in a specific place and with at least their own applications and different, at least in part, from one another, and a plurality of personal devices 2 similar to the first personal device 2, said access devices 1 being adapted for exchanging with one another at least part of the results obtained by each of them from said findings out of types of detected personal devices 2.

The system also comprises a services provider server 3 or management device bidirectionally communicated with said access devices 1, adapted for accessing the results of the findings out of types of detected personal devices 2 carried out by each of them and/or for accessing said data exchanged and received by each access device 1 from said plurality of personal devices 2, for running a learning algorithm, particularly a genetic learning algorithm, for processing said received information for the purpose of complementing said finding out of the characteristics or type of the detected personal devices 2, at least in reference to the brand and the model thereof, and also adapted for supplying the result of said finding out to the access devices 1, and for carrying out said exchange of results between said access devices 1 through the services provider server 3.

The different arrangements or configurations shown in FIGS. 1 to 5 and 8 are examples of the interconnection of access devices 1, servers 3, and different types of networks Re, Ri, and can be used, in addition to other purposes explained below and related to the management of the applications, for carrying out the mentioned exchange of data and/or results of said findings out of the type of detected personal device 2.

For one embodiment, the aforementioned short-range radio communication is a wireless communication in a local area, and the communication modules of both, the first access device 1 and the first personal device 2, are suitable for a local, wireless and bidirectional communication, and the first communication module 4 of the first access device 1 is intended for the automatic interaction with at least said first personal device 2 with bidirectional communication capacity if such device is within its respective coverage range, and is applied to detect said first personal device 2 and to acquire identifier data thereof, no necessarily by means of the mentioned dedicated polling and corresponding reception of responses, and it is also applied to send to the first personal device 2 a signal in the form of an invitation to receive an application, or program, and if the first personal device 2 already has an application installed, to send it a series of subscription notices or programmed information.

For a preferred embodiment, said first communication module 4 is adapted so that communication can only be initiated from the first module 4 itself, and to not be detected and/or identified by said first personal device 2. In other words, while the second communication module 5 can be detected by the user, who may initiate communication with it when desired and can voluntarily interact with it, this is not the case as regards the first communication module 4, because its design camouflages it for the user, the mentioned automatic interactivity consisting of a data exchange with the personal device 2, carried out invisibly for the user, for the purpose of setting up correct communication (adaptation of protocols, synchronization, etc.) for carrying out the aforementioned actions (detection, sending of invitation, etc.).

For another embodiment, the mentioned electronic system of the first access device 1 (or equivalent ones) comprises a coverage adjustment module 6 (see FIGS. 6 and 7) associated to said first 4 and second 5 communication modules, and suitable for adjusting said coverage range or coverage ranges for the purpose of very precisely setting them to the dimensions and geometry of the establishment where they are installed.

The first 4 and second 5 communication modules are suitable for communicating in parallel with several personal devices equivalent to said first personal device 2 in a manner similar to how it is done with said first personal device 2 by means of identical or different technologies and/or protocols.

The electronic system of said first access device 1 comprises a third communication module 7 suitable for bidirectionally communicating with a computer 3 acting as a services provider server, with an internal network, with an external network and/or with a second access device, both the computer 3 and the second access device comprising a respective communication module suitable for communicating with said third communication module 7 of said first access device 1. Both the first 1 and the second access devices are, as mentioned above, preferably those proposed by the third aspect of the present invention.

The third communication module 7 comprises a series of communication sub-modules 7a, 7b (see FIGS. 6 and 7) suitable for at least communicating through cable in a local area and/or through cable in an extensive area and/or in a wireless manner in a local area and/or in a wireless manner in an extensive area.

The access device or first access device 1 described up to this point can be seen in detail in FIG. 6 and could be considered a basic access device 1 or an access device with basic functionalities. In this case the aforementioned control and storage means 14 do not have a very large capacity for storing and managing preferably a single application with little associated multimedia information.

FIG. 7 shows an embodiment contemplating an access device 1 with greater functionalities and capacities than those described up to this point for the access device 1 shown in FIG. 6, especially in relation to the control and storage module 14, and it also has a larger number of modules, each of them with a specific function to be carried out. Said modules will be described below, but nevertheless it is necessary to stress that other access devices 1 are also proposed which do not have all the modules such as that shown in FIG. 7, and they can be considered to have an evolutionary level or intermediate complexity that is between the most basic one (FIG. 6) and the most complex one (FIG. 7).

The mentioned additional modules are the following:

A routing module 11 for connecting said second communication module 5 with said third communication module 7 for the case of simply enabling communication for a user who has connected in a wireless and local manner to another external device in a local or extensive manner.

The communications circulating through said routing module 11 can be managed and controlled both by means of a control system designed for such purpose and comprised in the routing module 11, and by means of said control and storage module 14, to which end the routing module 11 is associated thereto, or by means of a combined action of both. This will depend on the amount of information to be communicated and on the management complexity required by said communication.

Another of said additional modules is, as can be seen in FIG. 7, an intermediate storage module 10, which in FIG. 7 is shown connected between said second communication module 5 and said routing module 11, for example for temporarily storing blocks of the information to be transmitted through the routing module 11, and between the second communication module 5 and the non-volatile memory 8 for temporarily storing the contents to be sent from the non-volatile memory 8 when the transmission is carried out in blocks. Nevertheless, even though it is not shown, it is possible to connect said intermediate storage module 10 between the second communication module 5 and only one either the routing module 11 or the non-volatile memory 8, depending on the embodiment.

Said intermediate storage module 10 preferably comprises a control system suitable for managing and controlling the temporarily stored information as well as for its transmission and reception.

The incorporation of a power module 13 (see FIG. 7), including an uninterrupted power system 13a (UPS), with the possibility of a connection to the electric power grid, as well as a battery 13b, has been intended so as to assure the operation of the proposed access devices 1.

FIG. 7 also shows a series of sub-modules into which some of the main modules of the illustrated access device 1 have been divided for one embodiment. Some of them are also shown in FIG. 6, as is the case of the previously explained first $4a_1 \ldots 4a_n$ and second $4b_1 \ldots 4b_n$ communication sub-modules of the first communication module 4, which are associated to one another such that each of the second sub-modules $4b_1 \ldots 4b_n$ works with the same technology and protocol as a respective first sub-module $4a_1 \ldots 4a_n$ with which it is associated.

Said second sub-modules $4b_1 \ldots 4b_n$ are adapted to operate simultaneously for setting up different communication paths with different technologies and/or protocols, if needed.

As regards the second communication module 5, the latter is also divided into different sub-modules $5a_1 \ldots 5a_n$, each of the which has been designed to work with a defined technology and/or protocol.

The sub-modules 7a and 7b are also divided into blocks $7a_1 \ldots 7a_n$ and $7b_1 \ldots 7b_n$, respectively, for the same purpose, i.e. working with different technologies and/or protocols.

FIGS. 6, 7 and 8 show a series of antennas connected to the different mentioned communication sub-modules, such antennas having the references $A4_1 \ldots A4_n, A5_1 \ldots A5_n$ and $A7b_1 \ldots A7b_n$, as they belong to the wireless communication sub-modules $4b_1 \ldots 4b_n, 5a_1 \ldots 5a_n$, and $7b_1 \ldots 7b_n$, respectively.

The control module 9 is schematically divided into a block representative of a processing unit 9a, or CPU, and a volatile memory 9b, although it will include another series of electric and electronic circuitry which is not shown in the drawings.

As regards the non-volatile memory 8, it comprises a sub-module 8a incorporating an operative system, a sub-module 8b where the management application of the access device 1 is located, a sub-module 8c where the application to be sent to the personal device 2 is stored, and which also acts as a data repository and where at least the multimedia information to be sent is stored, and finally a series of connectors $8d_1 \ldots 8d_1$, for being able to access the memory 8 externally and/or for connecting an additional non-volatile memory 15 if a memory increase is needed.

Access devices 1, both that shown in FIG. 6 and the one shown in FIG. 7, can operate autonomously, according to the arrangement of FIG. 1 (or with several personal devices 2 at the same time), but obviously the one in FIG. 7 can carry out more functions and also provide a greater amount of contents and supply and manage more complex applications due to the fact that its respective control and storage module 14 has a greater capacity.

It must be pointed out that the aforementioned non-volatile memory 8 can be updated through the aforementioned third communication module 7 so that the contents to be transmitted to the personal devices 2 can be frequently renewed.

For another embodiment of the proposed system, the latter comprises one of said access devices with said greater functionalities (see FIG. 7), which can also be the one proposed according to the third aspect of the present invention, acting like a master 1m, communicating with one of said access devices with fewer functionalities (see FIG. 6) acting like a slave 1s, with an electronic system comprising a respective communication module similar to the third communication module 7 of the first access device 1 and suitable for communicating with it, and a control and storage module similar to said control and storage module 14 of the first access device 1 but with greater capacity, said master access device 1m being suitable for controlling and managing said slave access device is and for increasing and/or updating at least in part the contents of the non-volatile memory of the slave access device 1s.

Said access device acting as a master 1m is suitable for communicating with a plurality of access devices similar to said first access device 1, all of them acting as a slave is with respect to the master access device 1m, which acts with respect to each of them in a manner which is identical or similar to how it does with respect to the first access device 1 when the latter acts as a slave 1s. Such situation is reflected by the arrangement of FIG. 2, in which each access device, either the master 1m or the slaves 1s, are communicating wirelessly with several personal devices 2 at the same time.

The aforementioned non-volatile memory 8 (shown in FIGS. 6 and 7), also has multimedia information and/or one or more sub-applications recorded therein, the access device comprising the non-volatile memory 8 being suitable for sending to the first personal device 2 said multimedia information and/or said sub-applications, in addition to said application which is suitable for managing the multimedia information and the sub-applications for the purpose of supplying to the user of the first personal device 2 said and/or other multimedia information by means of the use, for example, of the proposed method according to the first aspect of the present invention.

The access device acting as a master 1m generally comprises, as can be seen in FIG. 7, respective first 4 and second 5 communication modules and a coverage adjustment module 6 similar to the one of the first access device 1 for the purpose of setting up communications with personal devices 2 (see FIGS. 2 and 4). Nevertheless, for an embodiment not shown, the proposed system comprises using an access device as a master 1m, but which does not incorporate said communication modules 4, 5 or said coverage adjustment module, said access device acting as a master 1m therefore not being used for directly communicating with personal devices 2, but only through respective slave access devices is controlling them and/or enabling the communication between them for exchanging or requesting information that they may need.

The arrangement of FIG. 4 shows an embodiment of the proposed system in which an access device acting as a master 1m is bidirectionally communicated through a respective third communication module 7 with a computer 3 acting as the services provider server, said computer 3 being suitable for updating, at least in part, the contents of the non-volatile memory 8 of the master access device 1m, as has been explained in the description of the method proposed by the first aspect of the present invention.

The mentioned reference data structures, explained in detail in the description of the method proposed by the first aspect of the present invention, are also stored in the non-volatile memory 8 or in other memories of the access device 1, said storage having occurred directly from the access device 1 itself, through other master access devices 1m or through the services provider server 3 (previously referred to as ASP in the description of FIG. 9), with any of the arrangements or configurations shown in FIGS. 1 to 5 and 8 according to the embodiment, the content of said memory 8 being increased when new data is added to the reference data structure, as previously explained.

On the other hand, the aforementioned control module 9 is adapted for accessing the identification algorithm (or algorithms) referred to in the description of the method, which is recorded in said non-volatile memory 8 or in another memory, and is also adapted for running said algorithm for the purpose of carrying out step a.6) of the method, as well as for carrying out the comparisons of the described univocal indicators and the corresponding assignments of characteristics to the detected personal device 2 according to said comparisons.

As regards the first personal device 2 and other similar devices 2 also comprised in the proposed system according to the second aspect of the present invention, for a preferred embodiment each of these devices comprises display means, such as a display 12, for displaying the indicators associated to the applications and sub-applications and for displaying multimedia information.

Each personal device 2 further comprises operation means, such as a keypad, to be operated by their respective users for at least selecting and running said applications and/or sub-applications.

The technology to be used for the short-range radio communication between the personal devices 2 and the access devices 1 can be any technology that a person skilled in the art considers suitable, such as, for example, Bluetooth®, Wi-Fi, NFC (Near Field Communications), UWB (Ultra Wide Band), Zigbee, Wireless USB, RFID (Radio-Frequency Identification) or other radio-frequency protocols. As previously indicated, each access device 1 can simultaneously set up, with no interference, several individual communication paths with several personal devices 2 using different technologies and/or protocols for each of them.

Even though the access device 1 of FIG. 7 can be considered, from a modular approach, the most evolved device, depending on the capacity of the modules it incorporates, there are various levels of capacities to be developed for various access devices 1 with the same modules.

An example of this is an embodiment in which an access device 1 has the capacity for storing only a small video frame, such as a promotional advertisement, and of emitting it continuously by means of setting up a series of individual paths with respective personal devices 2, supplying to all of them the same contents. Such access device 1 would have the modules of FIG. 7 but without requiring a large capacity for the modules, even in some cases without the need of using some of them if the access device 1 is always applied to said single function. In fact even the most basic access device 1 shown in FIG. 6 could be used. For example the non-volatile memory 8 may simply consist of a flash-type memory.

For an embodiment similar to the previous one, the video frame to be sent could in part be in the access device 1 directly communicating with the personal devices 2 and in part in another access device which the first one would access through its respective third communication module 7. Such embodiment is especially applicable for the case of the most basic access device 1, the storage capacity of which is smaller.

There are infinite configuration possibilities for the proposed system which incorporate several access devices 1, with more or less functionalities, which will depend on the necessary requirements of the establishments where they will be installed.

FIG. 8 shows one of said configurations, integrating several access devices 1 in a single system with different functionality levels, some of them connected through an internal network Ri forming a group which, together with others is connected to an external network Re which is connected to an external system or server 3e.

Specifically, FIG. 8 shows two areas or premises $L_1$, $L_2$ represented by two rectangles with discontinuous lines, the first of the which includes a single access device 1 which a series of personal devices 2 are connected to, in this case mobile telephones 2, and a group of access devices $1i_1$ ... $1i_n$ communicated with other personal devices 2a. All the access devices of the first area $L_1$ are wirelessly connected by means of their respective third communication modules 7 through an internal network Ri, and some of them are communicated directly to an external network Re, also wirelessly. Said internal network Ri is controlled by an internal server 3i which controls, supervises and updates the contents of the respective access devices 1, $1i_1$ ... $1i_n$ as regards the mentioned applications, sub-applications and multimedia information and/or as regards the univocal indicators, hypotheses, exportable data, tables, etc. Said server 3i is also communicated with an external network 3e.

Focusing on the first area $L_1$, three arrows are drawn, representing said communication between the mobile telephones 2 and access device 1 acting alone:

an arrow indicating bidirectional communication with the first module 4, referring to the aforementioned automatic interaction used for the detection and identification of the mobile telephones, said interaction including: the aforementioned polling with multiple technologies and/or protocols, the responses to said polling, as well as the subsequent data exchange posterior once the individualized communication or communications are set up with one or more mobile telephones 2, said data exchange including the sending of requests and reception of responses thereto in relation to the mentioned finding out of whether or not the mobile telephone 2 accepts binary data, and to the demand for the exportable and public data of the mobile telephone 2 used for carrying out the finding out of step a.6), with its corresponding responses (including said exportable data).

another arrow pointing to the mobile telephones 2 indicating the aforementioned sending of a signal in the form of an invitation to receive an application, and another more arrow pointing to the second communication module 5 indicating the sending of the acceptance of said invitation (or of the aforementioned petition without having received a prior invitation).

As regards the communication between the mobile telephones 2a and the aforementioned group of access devices $1i_1$ ... $1i_n$, FIG. 8 shows the moment in which the bidirectional interactive communication with the second communication modules 5 (derived from the functionality of the application being run in the mobile telephones 2i) explained above occurs.

The right side of FIG. 8 shows the aforementioned second area $L_2$, distanced from the first area $L_1$, with a group of access devices $1e_1$ ... $1e_n$ communicated with respective mobile telephones 2e. The communication herein represented by the two drawn arrows refers in the first place and as regards the bidirectional arrow to the aforementioned detection and identification of the personal devices 2e, and the arrow pointing to the mobile telephones 2e refers to the sending of subscription notices or programmed information once said identification is carried out. This is all carried out by the respective first communication modules 4.

Obviously the shown situations only explain the different communications that can be set up according to the invention for a certain moment, the different communications explained being exchangeable between the different access devices and mobile telephones shown, for another moment.

The access devices $1e_1$ ... $1e_n$ are communicated by means of their respective third communication modules 7 with the aforementioned external network Re which the aforementioned internal server 3i of the first area $L_1$ is connected to wirelessly, such that both areas $L_1$, $L_2$ are thus intercommunicated.

Said external network Re is in turn communicated with an external server 3e supervising the entire system both in relation to the first area $L_1$ and to the second area $L_2$, being able to manage both the mentioned applications, sub-applications and multimedia information, and the exchange thereof, such as the exchange of univocal indicators, hypotheses, exportable data, tables, etc., as well as running the aforementioned genetic algorithm for complementing step a.6) of the proposed method.

In FIG. 8, both servers 3i, 3e are divided into two respective sub-modules $3i_a$-$3i_b$, $3e_a$-$3e_b$, the first ones $3i_a$, $3e_a$ representing the part of the servers carrying out the management of the system and the second ones $3i_b$, $3e_b$ being responsible for managing the contents.

The configurations described in the present specification are simply several configurations shown as a sample of all the possible combinations to be carried out.

As regards the personal devices 2, although they are shown in the Figures as mobile telephones, they can also be any device that a person skilled in the art considers appropriate, such as electronic agendas, portable computers, audio players or portable video players.

As regards the embodiments included in the aforementioned second line of utilities for which the central device is an actor personal device 101, such as a mobile telephone 101, and the surrounding devices are target devices 102, FIG. 11 shows, at a basic and schematic level, the inside of an actor personal device 101, comprising the mentioned communication module 104 with corresponding antennas 110A4$_1$ ... 110A4$_n$, and the mentioned control module 109, which is adapted for:

receiving and processing several of said radio-frequency signals coming from respective target devices 102 (see FIG. 10) with technologies and/or protocols different from one another, and which are detected by several of said dedicated first communication sub-modules, for example two 104$a_1$, 104$a_2$, and for:

controlling said second communication sub-modules 104$b_1$ ... 104$b_n$ for automatically selecting from the second communication sub-modules 104$b_1$, 104$b_2$ suitable for setting up communication with said technologies and/or protocols of said several radio-frequency signals, for example two, a second sub-module 104$b$, and setting up by means of the same said individualized communication with one of said target devices 102 using the same technology and the same protocol with which the latter has sent said radio-frequency signal as a response to the polling.

The criteria for carrying out said selection have already been explained above for different embodiments, though these embodiments should not be considered as limiting.

Although FIG. 11 has only shown a few components of the inside of an actor personal device 101, for other embodiments, not shown, such device has several modules, some of which are included in the access devices 1 representative of the first line of utilities and are shown in FIGS. 6 and 7, such as memories, batteries, etc., although others therein included are not necessary for the functions to be carried out by the actor personal device 101 of the second line of utilities.

A person skilled in the art may introduce changes and modifications in the described embodiments without departing from the scope of the invention as it is defined in the attached claims.

The invention claimed is:

1. A radio communication method between at least one central device and at least one device suitable for emitting a radio-frequency signal of at least one short-range technology and at least one protocol and for setting up bidirectional short range radio communications with said at least one central device for bidirectionally communicating via said at least one short-range technology and said at least one protocol with said at least one central device, said method comprising sequentially carrying out the following steps automatically:

a.1) polling by said at least one device a surrounding area thereof via said at least one short range technology and said at least one protocol;

a.2) detecting and identifying, by said at least one device, said at least one central device through the picking up of at least one radio-frequency signal emitted automatically by said at least one central device via said at least one short-range technology and said at least one protocol, said emitted radio-frequency signal including at least one unique identifier of said at least one device;

a.3) setting up an individualized communication between said at least one device and said at least one central device using said at least one short-range technology and said at least one protocol; and wherein said at least one central device is an access device located in a first specific place, and said at least one device is a personal device, used by a user, suitable for carrying out said bidirectional short-range radio communications with at least said access device, automatically carrying out after at least said step a.3) the following step:

a.4) finding out if said personal device is adapted for receiving binary data through said individualized communication set up with said access device, said finding out being carried out in accordance with one of the group consisting of:

by processing, by the access device, of said radio-frequency signal emitted by the personal device picked up by the access device, if such signal includes sufficient information so that the processing produces said finding out, and by sending, by the access device, of a signal in the form of a question to the personal device, a negative response to which, in the form of a negative corresponding signal, or an absence of a response after a certain period of time, is indicative that the personal device is not suitable for receiving binary data, and an affirmative response, in the form of a positive corresponding signal, is indicative that the personal device receives the binary data.

2. The method according to claim 1, wherein the individualized communication comprises transmitting data from said at least one central device to said at least one device.

3. The method according to claim 2, wherein the data includes multimedia information and/or multimedia sub-applications.

4. The method according to claim 2, wherein the data includes applications in the form of menus offered to a user of the at least one device through a display of the at least one device for user selection thereof.

5. The method according to claim 1, wherein said at least one short-range technology and said at least one protocol are selected from the group consisting of: Bluetooth®, Wi-Fi, near-field communication (NFC), ultra-wide band (UWB), ZigBee, Wireless USB, and RFID.

6. The method according to claim 1, further comprising automatically launching an application or sub-application by said at least one device when said at least one device enters a coverage area of said at least one central device.

7. The method according to claim 1, further comprising automatically sending to said at least one device an application for being installed within a memory of said at least one device.

8. The method according to claim 7, further comprising automatically disconnecting the individualized communication between said at least one central device and said at least one device if said at least one device has the latest version of said application installed therein.

9. The method according to claim 7, further comprising, prior to automatically sending said application, finding out by said at least one central device characteristics or type of said at least one device, and transmitting by said at least one central device a version of said application adapted to the characteristics or type of said at least one device.

10. The method according to claim 1, wherein said at least one device is a mobile telephone.

11. The method according to claim 1, wherein the individualized communication comprises transmitting data from said at least one central device to said at least one device, wherein the data includes elements suitable for display by a display screen of said at least one device.

12. A system of individualized short-range radio communication, applicable to communications which includes applications, programs, and multimedia information, the system comprising: a plurality of surrounding devices; and a plurality of central devices each having a corresponding coverage area; wherein each of said plurality of surrounding devices configured for bidirectionally communicating via at least one short-range technology and at least one protocol with each of said plurality of central devices, wherein each of said plurality of surrounding devices suitable for detecting radio-frequency signals of multiple technologies and protocols, and for setting up bidirectional short-range radio communications using at least one of said multiple technologies and at least one of said multiple protocols, wherein each of said plurality of surrounding devices comprises a communication module configured for: automatically polling an environment for automatically detecting possible radio-frequency signals emitted by said plurality of central devices with at least one of said multiple technologies and at least one of said multiple protocols; automatically setting up an individualized communication with one of said plurality of central devices using the at least one of said multiple technologies and the at least one of said multiple protocols, as a response to said polling and detection of radio-frequency signals; automatically finding out if a personal device is adapted for receiving binary data through said individualized communication set up with an access device; said finding out being carried out in accordance with one of the group consisting of: by processing, by the access device, of said radio-frequency signal emitted by the personal device picked up by the access device, if such signal includes sufficient information so that the processing produces said finding out, and by sending, by the access device, of a signal in a form of a question to the personal device, a negative response to which, in a form of a negative corresponding signal, or an absence of a response after a certain period of time, is indicative that the personal device is not suitable for receiving binary data, and an affirmative response, in a form of a positive corresponding signal, is indicative that the personal device receives the binary data.

13. The system according to claim 12, wherein each of said plurality of central devices is an access device located in a specific place, and each of said plurality of surrounding devices are personal devices, used by users, suitable for carrying out bidirectional short-range radio communications with each of said plurality of central devices when entering in the coverage area thereof.

14. The system according to claim 12, wherein each of said plurality of central devices includes a communication module being adapted for finding out if one of said plurality of surrounding devices entering in its coverage area is adapted for receiving binary data through said individualized communication.

15. The system according to claim 12, wherein the individualized communication comprises transmitting data.

16. The system according to claim 15, wherein the data includes multimedia information and/or multimedia sub-applications.

17. The system according to claim 15, wherein the data includes applications in the form of menus offered to a user of one of the plurality of surrounding devices.

18. The system according to claim 12, wherein said at least one short-range technology and said at least one protocol are selected from the group consisting of: Bluetooth®, Wi-Fi, near-field communication (NFC), ultra-wide band (UWB), ZigBee, Wireless USB, and RFID.

19. The system according to claim 12, wherein the communication module is further configured for automatically launching an application or sub-application when each of said plurality of surrounding devices enters the corresponding coverage area of one of said plurality of central devices.

20. The system according to claim 12, wherein each of said plurality of central devices comprises a communication module configured for automatically sending to at least one of said plurality of surrounding devices an application for being installed within a memory of said at least one of said plurality of surrounding devices.

21. The system according to claim 12, wherein said plurality of surrounding devices are mobile telephones.

22. The system according to claim 12, wherein the individualized communication comprises transmitting data from said one of said plurality of central devices, wherein the data includes elements suitable for display by a display screen of said plurality of surrounding devices.

23. A central device applicable to individualized short-range radio communications which includes applications or programs and multimedia information, and for setting up bidirectional short-range radio communications, and comprising an electronic system configured for: automatically detecting possible radio-frequency signals emitted from a plurality of surrounding devices with at least one of multiple technologies and at least one of multiple protocols, and for acquiring identifier data in the form of at least one unique identifier, or identifier registration, of each of the surrounding devices, included in said radio-frequency signals; automatically setting up individualized communication with each of said plurality of surrounding devices using at least a technology and a protocol with which each one has emitted one of said radio-frequency signals; automatically finding out if a personal device is adapted for receiving binary data through said individualized communication set up with said central device; said finding out being carried out in accordance with one of the group consisting of: by processing, by an access device, of said radio-frequency signal emitted by the personal device picked up by the access device, if such signal includes sufficient information so that the processing produces said finding out, and by sending, by the access device, of a signal in a form of a question to the personal device, a negative response to which, in a form of a negative corresponding signal, or an absence of a response after a certain period of time, is indicative that the personal device is not suitable for receiving binary data, and an affirmative response, in a form of a positive corresponding signal, is indicative that the personal device receives the binary data.

24. The central device according to claim 23, wherein the individualized communication comprises transmitting data from said central device to said plurality of surrounding devices, wherein the data includes elements suitable for display by a display screen of said plurality of surrounding devices.

25. The central device according to claim 23, wherein the electronic system is further configured for finding out if one of said plurality of surrounding devices entering in a coverage area of said central device is adapted for receiving binary data through said individualized communication.

26. The central device according to claim 23, wherein the individualized communication comprises transmitting data.

27. The central device according to claim 26, wherein the data includes multimedia information and/or multimedia sub-applications.

28. The central device according to claim 26, wherein the data includes applications in the form of menus offered to a user of one of the plurality of surrounding devices.

29. The central device according to claim 23, wherein said multiple technologies and multiple protocols are selected from the group consisting of: Bluetooth®, Wi-Fi, near-field communication (NFC), ultra-wide band (UWB), ZigBee, Wireless USB, and RFID.

30. The central device according to claim 23, wherein the electronic system is further configured for automatically launching an application or sub-application when each of said plurality of surrounding devices enters a coverage area of said central device.

31. The central device according to claim 23, wherein the electronic system is further configured for automatically sending to at least one of said plurality of surrounding devices an application for being installed within a memory of said at least one of said plurality of surrounding devices.

32. The central device according to claim 23, wherein said plurality of surrounding devices are mobile telephones.

* * * * *